US012319094B2

(12) United States Patent
Kuriyama et al.

(10) Patent No.: US 12,319,094 B2
(45) Date of Patent: Jun. 3, 2025

(54) TIRE

(71) Applicant: SUMITOMO RUBBER INDUSTRIES, LTD., Hyogo (JP)

(72) Inventors: Tomohisa Kuriyama, Hyogo (JP); Ryota Ikeda, Hyogo (JP); Chisato Omori, Hyogo (JP); Kohei Miyoshi, Hyogo (JP); Hiroaki Koga, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 526 days.

(21) Appl. No.: 17/546,188

(22) Filed: Dec. 9, 2021

(65) Prior Publication Data

US 2022/0203774 A1     Jun. 30, 2022

(30) Foreign Application Priority Data

Dec. 28, 2020   (JP) ................................. 2020-218180
Dec. 28, 2020   (JP) ................................. 2020-218182

(51) Int. Cl.
*B60C 11/03*     (2006.01)
*B60C 11/12*     (2006.01)

(52) U.S. Cl.
CPC ...... *B60C 11/0304* (2013.01); *B60C 11/1236* (2013.01); *B60C 11/1263* (2013.01);
(Continued)

(58) Field of Classification Search
CPC ............. B60C 11/0304; B60C 11/1236; B60C 11/1281; B60C 2011/133
See application file for complete search history.

(56) References Cited

U.S. PATENT DOCUMENTS 2,268,344 A  * 12/1941  Shesterkin .......... B60C 11/0309
                                              152/DIG. 4
6,443,199 B1 *  9/2002  Scarpitti ............... B60C 19/001
                                              152/209.1
(Continued)

FOREIGN PATENT DOCUMENTS

EP         213452 A2 *  3/1987
JP     06-239110 A   *  8/1994
(Continued)

OTHER PUBLICATIONS

Machine translation for Japan 06-239110 (Year: 2024).*
(Continued)

*Primary Examiner* — Steven D Maki
(74) *Attorney, Agent, or Firm* — Greenblum & Bernstein, P.L.C.

(57) ABSTRACT

A tire includes a tread portion including first and second tread edges, circumferential grooves, and land portions. The land portions include a crown land portion, a first middle land portion, and a second middle land portion. Under a 50% loaded condition, the first middle land portion, the crown land portion, and the second middle land portion respectively have axial widths W1$m$, Wc, and W2$m$ of ground contact surfaces, the widths satisfying the following formula, W1$m$>Wc>W2$m$. The crown land portion includes an outer ground contact surface and an inner ground contact surface. The outer ground contact surface and the inner ground contact surface respectively have widths Wco and Wci in the tire axial direction, the widths satisfying the following formula, Wco>Wci.

15 Claims, 17 Drawing Sheets

(52) U.S. Cl.
CPC ............... *B60C 2011/0353* (2013.01); *B60C 2011/0386* (2013.01)

(56) References Cited

U.S. PATENT DOCUMENTS

| | | | |
|---|---|---|---|
| 2013/0092304 A1* | 4/2013 | Murata | B60C 11/0306 |
| | | | 152/209.9 |
| 2014/0283967 A1 | 9/2014 | Inoue | |
| 2017/0100965 A1* | 4/2017 | Kikuchi | B60C 11/1263 |
| 2017/0210177 A1* | 7/2017 | Osawa | B60C 11/0306 |
| 2019/0061435 A1* | 2/2019 | Kajita | B60C 11/1315 |
| 2022/0203773 A1* | 6/2022 | Hagihara | B60C 11/1263 |

FOREIGN PATENT DOCUMENTS

| | | | |
|---|---|---|---|
| JP | 2003-170705 A | * | 6/2003 |
| JP | 2010-132181 A | | 6/2010 |
| JP | 2014-184828 A | | 10/2014 |
| WO | WO-2014056651 A1 | * | 4/2014 |

OTHER PUBLICATIONS

Machine translation for Japan 2003-170705 (Year: 2024).*
Machine translation for WO 2014/056651 (Year: 2024).*
Machine translation for Europe 213452 (Year: 2024).*

* cited by examiner

US 12,319,094 B2

TIRE

RELATED APPLICATIONS

This application claims the benefit of foreign priority to Japanese Patent Applications Nos. JP2020-218180 and JP2020-218182, filed Dec. 28, 2020, which are incorporated by reference in its entirety.

FIELD OF THE INVENTION

The present disclosure relates to a tire.

BACKGROUND OF THE INVENTION

Patent document 1 below discloses a pneumatic tire including a tread portion having a crown land portion and a pair of middle land portions. The crown land portion and the middle land portions are formed into ribs which extend continuously in the tire circumferential direction. The pneumatic tire can suppress noise during running due to these characteristics.

PATENT DOCUMENT

[Patent Document 1]
  Japanese Unexamined Patent Application Publication 2010-132181

SUMMARY OF THE INVENTION

A large contact pressure acts on crown land portions and middle land portions of tires not only when traveling straight, but also when cornering. Thus, these land portions may contribute significantly to steering stability on dry roads. The inventors have found that the above performance can be further improved by modifying the configuration of these land portions.

The present disclosure has been made in view of the above circumstances and has a major object to provide a tire capable of improving steering stability on dry roads.

In one aspect of the present disclosure, a tire includes a tread portion having a designated mounting direction to a vehicle, the tread portion including a first tread edge located outside of a vehicle when mounted on the vehicle, a second tread edge located inside of a vehicle when mounted on the vehicle, a plurality of circumferential grooves extending continuously in the tire circumferential direction between the first tread edge and the second tread edge, and a plurality of land portions divided by the plurality of circumferential grooves. The plurality of land portions includes a crown land portion located on the tire equator, a first middle land portion adjacent to the crown land portion on the first tread edge side, and a second middle land portion adjacent to the crown land portion on the second tread edge side. Under a 50% loaded condition in which the tire is mounted onto a standard wheel rim with a standard pressure and grounded to a plane with a 50% tire load of a standard tire load at zero camber angles, the first middle land portion, the crown land portion, and the second middle land portion respectively have widths W1$m$, Wc, and W2$m$ in a tire axial direction of ground contact surfaces, the widths W1$m$, Wc, and W2$m$ satisfying the following formula (1)

$$W1m > Wc > W2m \qquad (1).$$

The crown land portion includes an outer ground contact surface located on the first tread edge side with respect to the tire equator, and an inner ground contact surface located on the second tread edge side with respect to the tire equator, and the outer ground contact surface and the inner ground contact surface respectively have widths Wco and Wci in the tire axial direction, the widths Wco and Wci satisfying the following formula (2)

$$Wco > Wci \qquad (2).$$

DETAILED DESCRIPTION OF THE INVENTION

Figure 1:
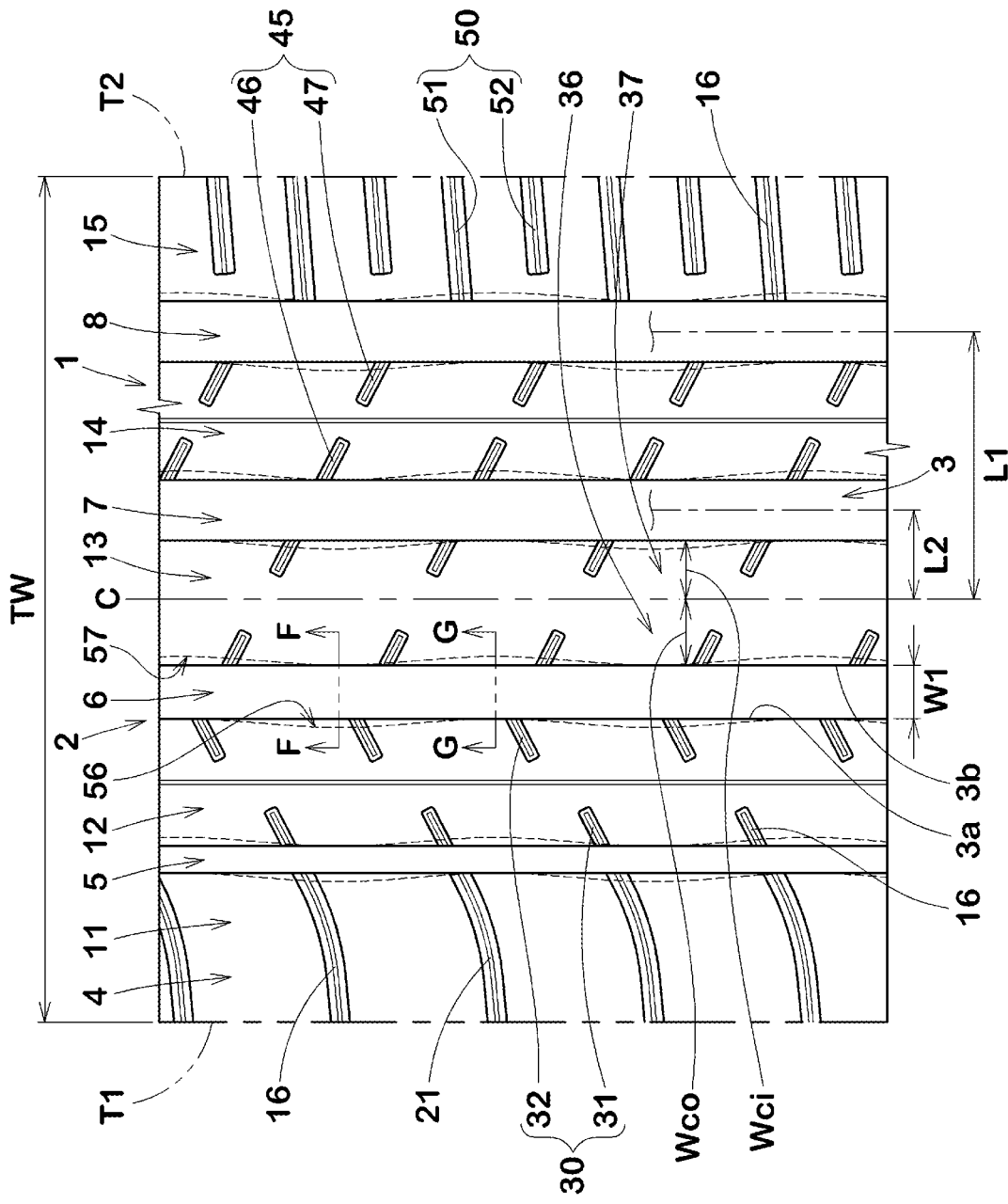
FIG. 1 is a development view of a tread portion showing an embodiment of the present disclosure.

Hereinafter, one or more embodiments of the present disclosure will be described with reference to the drawings. FIG. 1 is a development view of a tread portion 2 of a tire 1 showing an embodiment of the present disclosure. The tire 1 according to the present embodiment, for example, is suitably used as a pneumatic tire for a passenger car. The present disclosure is not limited to such an embodiment, and may be applied to a pneumatic tire for heavy load and a non-pneumatic tire in which the inside of the tire is not filled with pressurized air.

As illustrated in FIG. 1, the tire 1 according to the present embodiment includes the tread portion 2 having a designated mounting direction to a vehicle. The tread portion 2 includes a first tread edge T1 intended to be located outside a vehicle and a second tread edge T2 intended to be located inside the vehicle when the tire 1 is mounted on the vehicle. The mounting direction to a vehicle, for example, may be indicated by letters or symbols on the sidewall portions of the tire (not illustrated).

The first tread edge T1 and the second tread edge T2 are the outermost edges in the tire axial directions of the ground contact patch which occurs when the tire 1 being under a normal state is grounded on a flat surface with a 50% standard tire load at zero camber angles.

As used herein, when a tire is a pneumatic tire based on a standard, the "normal state" is such that the tire 1 is mounted onto a standard wheel rim with a standard pressure but loaded with no tire load. If a tire is not based on the standards or if a tire is a non-pneumatic tire, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in IRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. If a tire is not based on the standards or if a tire is a non-pneumatic tire, the "standard tire load" refers to the load acting on the tire when the tire is under a standard mounted condition. The "standard mounted condition" is such that the tire is mounted to a standard vehicle according to the purpose of use of the tire, and the vehicle is stationary on a flat road surface while being able to run.

The tread portion 2 includes a plurality of circumferential grooves 3 extending continuously in the tire circumferential direction between the first tread edge T1 and the second tread edge T2, and a plurality of land portions 4 divided by the circumferential grooves 3. The tire 1 according to the present embodiment is configured as a so-called five-rib tire in which the tread portion 2 is divided into five land portions 4 divided by the four circumferential grooves 3.

The circumferential grooves 3, for example, includes a first shoulder circumferential groove 5, a second shoulder circumferential groove 8, a first crown circumferential groove 6 and the second crown circumferential groove 7. The first shoulder circumferential groove 5 is arranged between the first tread edge T1 and the tire equator C. The second shoulder circumferential groove 8 is arranged between the second tread edge T2 and the tire equator C. The first crown circumferential groove 6 is arranged between the first shoulder circumferential groove 5 and the tire equator C. The second crown circumferential groove 7 is arranged between the second shoulder circumferential groove 8 and the tire equator C.

Preferably, a distance L1 in the tire axial direction from the tire equator C to the groove centerline of the first shoulder circumferential groove 5 or the second shoulder circumferential groove 8, for example, is in a range of 25% to 35% of the tread width TW. Preferably, a distance L2 in the tire axial direction from the tire equator C to the groove centerline of the first crown circumferential groove 6 or the second crown circumferential groove 7, for example, is in a range of 5% to 15% of the tread width TW. Note that the tread width TW is the distance in the tire axial direction from the first tread edge T1 to the second tread edge T2 under the normal state.

The circumferential grooves 3 according to the present embodiment, for example, extend straight in parallel with the tire circumferential direction. The circumferential grooves 3, for example, may extend in a zigzag or a wavy manner.

Preferably, a groove width W1 of the circumferential grooves 3, for example, is in a range of 2.0% to 8.0% of the tread width TW. In the present embodiment, the first shoulder circumferential groove 5 has the minimum groove width among the four circumferential grooves 3. However, the present disclosure is not limited to such an aspect. Preferably, a depth of the circumferential grooves 3, when the tire is a pneumatic tire, is in a range of 5 to 10 mm, for example.

The land portions 4 according to the present disclosure include a crown land portion 13, a first middle land portion 12 and a second middle land portion 14. The crown land portion 13 is located on the tire equator C, and is sectioned between the first crown circumferential groove 6 and the second crown circumferential groove 7. The first middle land portion 12 is adjacent to the crown land portion 13 on the first tread edge T1 side, and is sectioned between the first shoulder circumferential groove 5 and the first crown circumferential groove 6. The second middle land portion 14 is adjacent to the crown land portion 13 on the second tread edge T2 side, and is sectioned between the second shoulder circumferential groove 8 and the second crown circumferential groove 7.

The land portions 4 according to the present embodiment further include a first shoulder land portion 11 and a second shoulder land portion 15. The first shoulder land portion 11 includes the first tread edge T1, and is adjacent to the first middle land portion 12 on the first tread edge T1 side. The second shoulder land portion 15 includes the second tread edge T2, and is adjacent to the second middle land portion 14 on the second tread edge T2 side.

Figure 2:
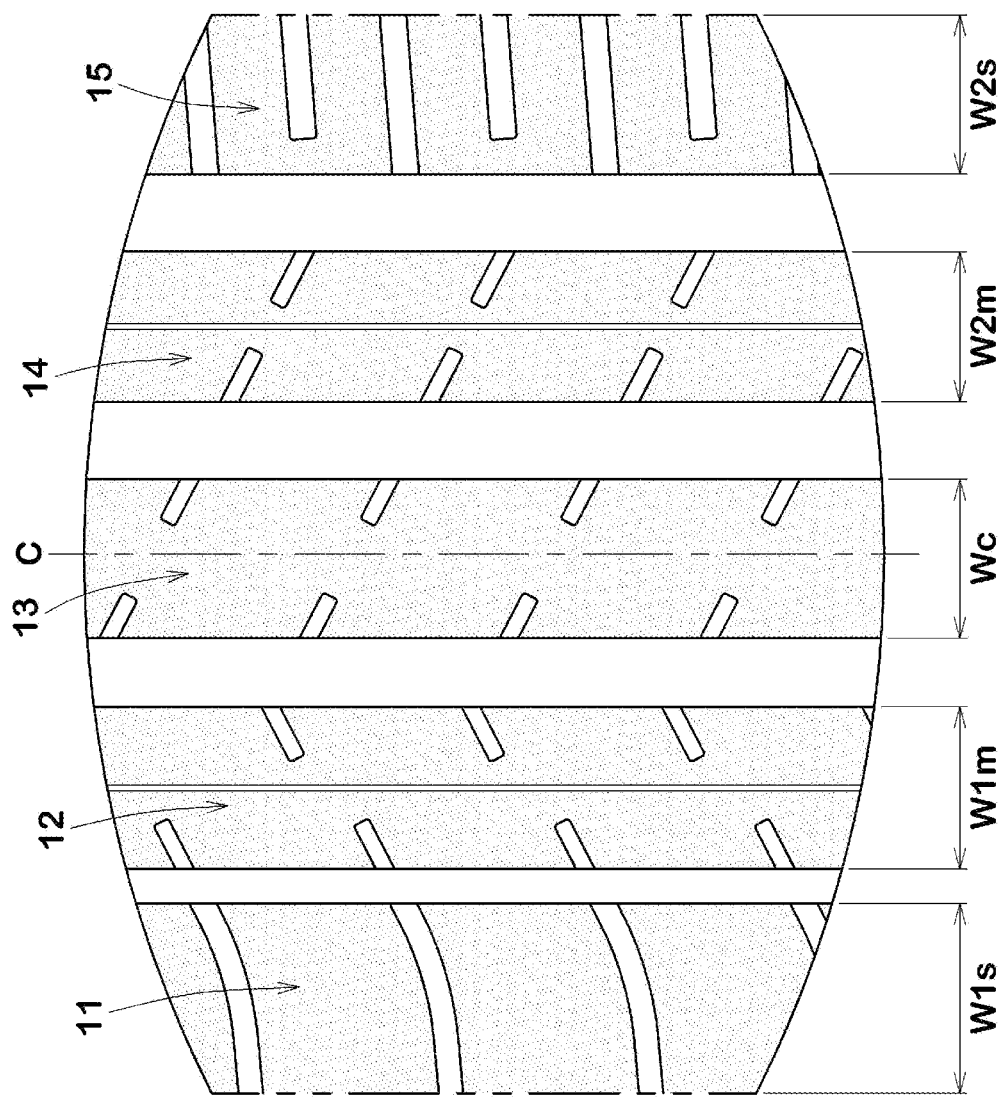
FIG. 2 is an enlarged view showing a shape of a ground contact patch of the tread portion.

FIG. 2 illustrates an enlarged view showing a shape of a ground contact patch of the tread portion 2. As illustrated in FIG. 2, under a 50% loaded condition in which the tire 1 is mounted onto the standard wheel rim with the standard pressure and grounded to a plane with a 50% tire load of the standard tire load at zero camber angles, the first shoulder land portion 11, the first middle land portion 12, the crown land portion 13, the second middle land portion 14 and the second shoulder land portion 15 respectively have widths $W1s$, $W1m$, $Wc$, $W2m$ and $W2s$ of ground contact surfaces in the tire axial direction, and the widths $W1m$, $Wc$, and $W2m$ satisfy the following formula (1)

$$W1m > Wc > W2m \qquad (1).$$

As illustrated in FIG. 1, the crown land portion 13 includes an outer ground contact surface 36 located on the first tread edge T1 side with respect to the tire equator C, and an inner ground contact surface 37 located on the second tread edge t2 side with respect to the tire equator C. In the present disclosure, the outer ground contact surface 36 and the inner ground contact surface 37 respectively have widths Wco and Wci in the tire axial direction, and the widths Wco and Wci satisfy the following formula (2)

$$Wco > Wci \quad (2).$$

The present disclosure, by adopting the above configuration, can improve steering stability on dry roads while ensuring various performances of the tire including wet performance. The following mechanism is presumed as the reason.

Due to the above configuration, in the tire 1 according to the present disclosure, rigidity of the land portions of the tread portion 2 increases toward the outside of the vehicle. Thus, the cornering force increases linearly as the steering angle increases, and steering stability on dry roads can be improved. In particular, since the crown land portion 13 satisfies the above equation (2), the above effect can be exhibited. It is presumed that the tires according to the present disclosure can improve steering stability on dry roads by the above mechanism.

Hereinafter, a more detailed configuration of the present embodiment will be described. Note that each configuration described below shows a specific embodiment of the present embodiment. Needless to say, the present disclosure can exert the above-mentioned effects even if it does not include the configuration described below. Further, even if any one of the configurations described below is applied independently to the tire of the present disclosure having the above-mentioned features, the performance improvement according to the added configuration can be expected. Furthermore, if some of the configurations described below are applied in combination to the present disclosure, it can be expected that the performance based on the added configurations will be improved.

Preferably, under the 50% loaded condition, the tire 1 according to the present embodiment satisfies the following formula (3).

$$W1s > W1m > Wc > W2m >= W2s \quad (3).$$

Such a tire 1 may have greater rigidity in the land portions closer to the first tread edge T1. Thus, even when the center of the ground contact surface is moved to the first tread edge T1 side by steering, steering response can be stable and cornering force can be generated linearly with the increase in the steering angle. Therefore, the tire 1 according to the present embodiment can further improve steering stability on dry roads (hereinafter, may be simply referred to as "steering stability"").

Under the 50% loaded condition, the width $W1s$ in the tire axial direction of the ground contact surface of the first shoulder land portion 11 is preferably in a range of 115% to 125% of the width Wc in the tire axial direction of the ground contact surface of the crown land portion 13. This optimizes stiffness of the first shoulder land portion 11 and can improve noise performance as well as the above effects.

From the same point of view, under the 50% loaded condition, the width $W1m$ in the tire axial direction of the ground contact surface of the first middle land portion 12 is preferably in a range of 101% to 107% of the width Wc in the tire axial direction of the ground contact surface of the crown land portion 13.

Under the 50% loaded condition, the width $W2m$ in the tire axial direction of the ground contact surface of the second middle land portion 14 is in a range of 90% to 99% of the width Wc in the tire axial direction of the ground contact surface of the crown land portion 13. As a result, noise performance when straight traveling can be improved. In addition, tire vibration when straight traveling is less likely to be transmitted to the vehicle body, and the ride comfort can also be improved.

From the same point of view, under the 50% loaded condition, the width $W2s$ in the tire axial direction of the ground contact surface of the second shoulder land portion 15 is preferably in a range of 90% to 99% of the width Wc in the tire axial direction of the ground contact surface of the crown land portion 13.

As a more preferred aspect, in the present embodiment, under the 50% loaded condition, the width $W2m$ of the second middle land portion 14 is the same as the width $W2s$ of the second shoulder land portion 15. As a result, the progress of wear between the second middle land portion 14 and the second shoulder land portion 15 may become uniform, and uneven wear resistance performance can be improved.

As illustrated in FIG. 1, the land portions 4 according to the present embodiment is provided with the sipes 16. As used herein, "sipe" refers to a narrow incision having a width of 1.5 mm or less between two sipe walls in the main body thereof. Preferably, a width of the sipes 16 is in a range of 0.2 to 1.2 mm, more preferably 0.5 to 1.0 mm. The sipes 16 may be provided with a widening width portion that opens to the ground contact surface with a width greater than the above-mentioned sipe width and/or with an enlarged-width bottom enlarged portion having a width greater than the above-mentioned sipe width (e.g., flask bottom shape).

Figure 3:
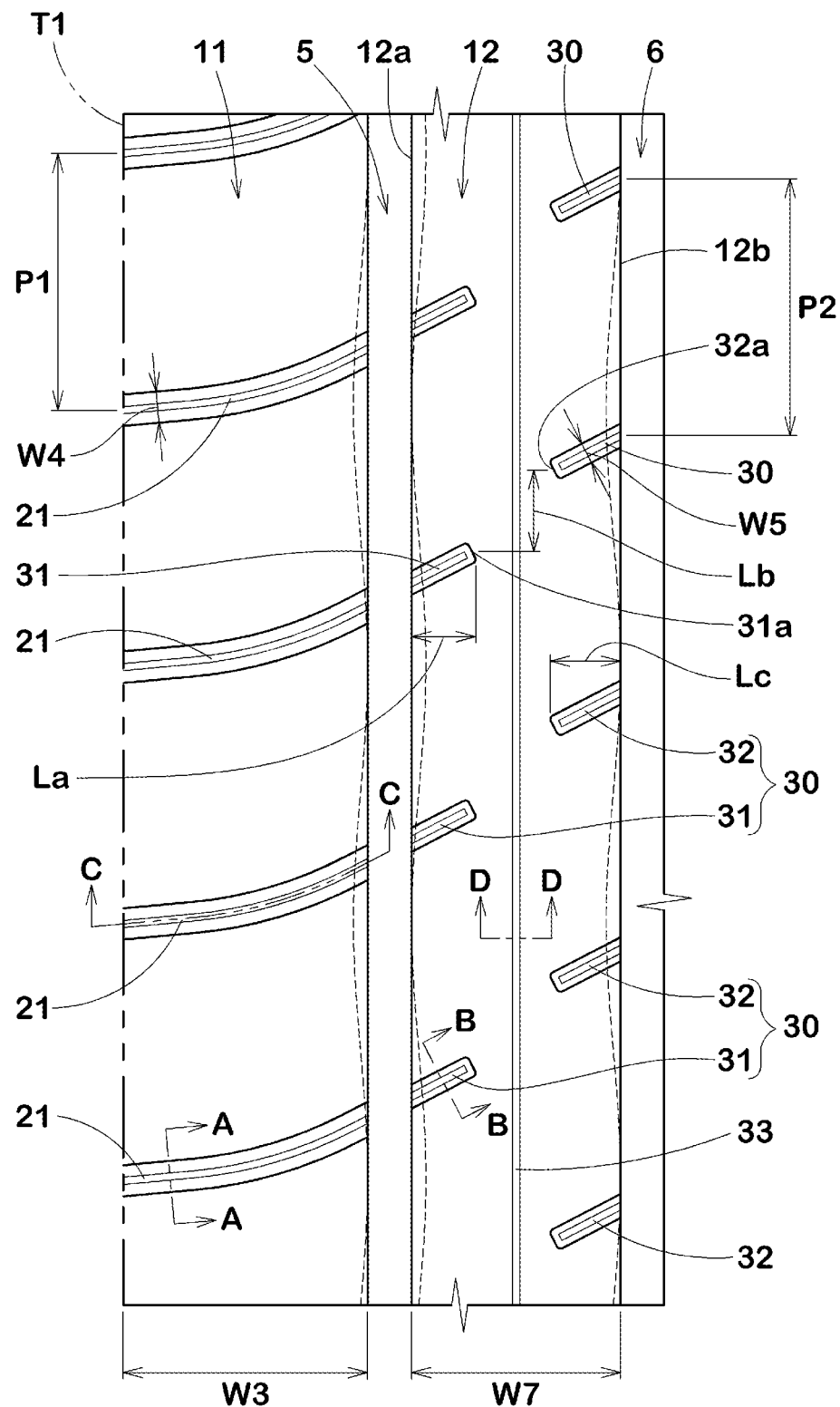
FIG. 3 is an enlarged view of a first shoulder land portion and a first middle land portion of FIG. 1.

FIG. 3 illustrates an enlarged view of the first shoulder land portion 11 and the first middle land portion 12. As illustrated in FIG. 3, the first shoulder land portion 11 is provided with only sipes. Thus, rigidity of the first shoulder land portion 11 can be increased. In the present embodiment, the first shoulder land portion 11 is provided with a plurality of first shoulder sipes 21 extending in the tire axial direction.

A pitch length P1 in the tire circumferential direction of the first shoulder sipes 21, for example, is in a range of from 100% to 130% of a width W3 in the tire axial direction of a tread face of the first shoulder land portion 11. Note that the pitch length P1 in the tire circumferential direction between two adjacent sipes is a distance parallel to the tire circumferential direction from the center position in the width direction in a cross-section of one sipe to the center position in the width direction in a cross-section of the other sipe. In addition, when the above-mentioned distances are not constant, the pitch length is an intermediate distance of the distances.

Preferably, the first shoulder sipes 21, at least, are communicated with the first shoulder circumferential groove 5. In the present embodiment, the first shoulder sipes 21, for example, extend from the first shoulder circumferential groove 5 to the first tread edge T1 so as to traverse the tread contact face of the first shoulder land portion 11 entirely. Note that the first shoulder sipes 21 are not limited to such an aspect and may include closed ends within the first shoulder land portion 11.

The first shoulder sipes 21, for example, are inclined in a first direction (in each Figure, upward to the right) with respect to the tire axial direction. An angle of the first shoulder sipes 21 with respect to the tire axial direction, for example, is in a range of 5 to 35 degrees. In some more preferred embodiments, the first shoulder sipes 21 may include portions with an angle increasing toward the second tread edge T2 with respect to the tire axial direction. Such first shoulder sipes 21 can generate friction force in the tire axial direction as well.

An opening width W4 on the tread face of the first shoulder sipes 21, for example, is greater than an opening width W5 on the tread face of first middle sipes 30. Specifically, the opening width W4 of the first shoulder sipes 21, for example, is in a range of from 4.0 to 8.0 mm. The opening width W5 of the first middle sipes 30, for example, is in a range of 2.0 to 6.0 mm. In addition, the opening width W5 of the first middle sipes 30 is in a range of 50% to 90% of the opening width W4 of the first shoulder sipes 21. Such first shoulder sipes 21 and first middle sipes 30 can improve uneven wear resistance of the tire.

Figure 4:
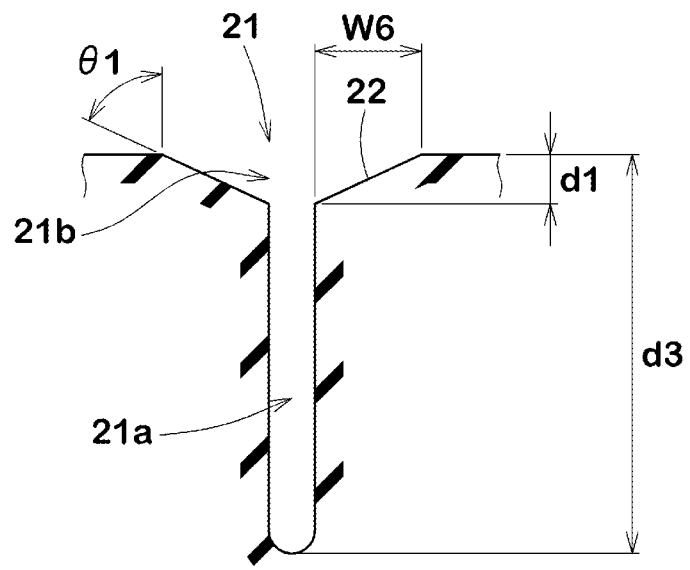
FIG. 4 is a cross-sectional view taken along the line A-A of FIG. 3.

FIG. 4 illustrates a cross-sectional view taken along the line A-A of FIG. 3, as a cross-section of the first shoulder sipes 21. As illustrated in FIG. 4, each of the first shoulder sipes 21 includes a main portion 21a extending in the tire radial direction and a widening width portion 21b opening to the tread face of the land portion with a larger width than that of the main portion 21a. In the present embodiment, a width of the main portion, for example, is in a range of 0.5 to 1.5 mm.

The widening width portion 21b of each first shoulder sipe 21 includes a pair of inclined surfaces 22 extending from the main portion 21a. In the present embodiment, the inclined surface 22 is a flat surface, and is inclined at an angle θ1 of from 50 to 70 degrees with respect to the tire radial direction. In such a widening width portion 21b, the actual ground contact area of the tread portion is expanded because the entire surface of the inclined surface 22 can be grounded when a large ground pressure is applied to the land portion. Thus, steering stability of the tire can further be improved.

A depth d1 of the widening width portion 21b of each first shoulder sipe 21 is preferably in a range of 10% to 30% of the maximum depth d3 of the first shoulder sipes 21, more preferably 0.5 to 2.0 mm. Note that the maximum depth d3 of the first shoulder sipes 21, for example, is in a range of 70% to 100% of the depth of the circumferential grooves 3.

A width W6 (a width along the tread face in the cross section of the sipe) of the widening width portion 21b of the first shoulder sipes 21, for example, is in a range of 2.0 to 4.0 mm.

Figure 5:
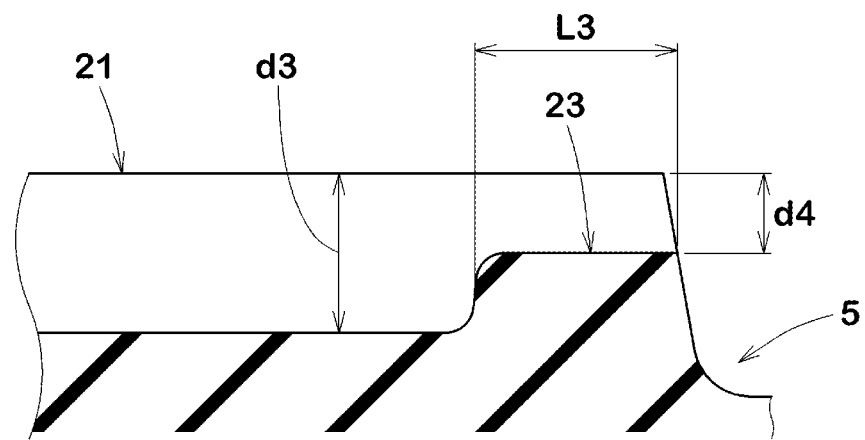
FIG. 5 is a cross-sectional view taken along the line C-C of FIG. 3.

FIG. 5 illustrates a cross-sectional view taken along the line C-C of FIG. 3. As illustrated in FIG. 5, at least one of the first shoulder sipes 21 includes a shallow bottom portion 23 in which a bottom thereof is locally raised. In the present embodiment, the shallow bottom portion 23, for example, is arranged on a portion that is in communication with the first shoulder circumferential groove 5. The minimum depth d4 of the shallow bottom portion 23 of the first shoulder sipe 21 is in a range of 40% to 60% of the maximum depth d3 of the first shoulder sipe 21. A length L3 in the tire axial direction of the shallow bottom portion 23 is in a range of 10% to 30% of the width W3 (shown in FIG. 3) in the tire axial direction of the first shoulder land portion 11. Note that the length L3 of the shallow bottom portion 23 is measured at the center position in the height direction of the shallow bottom portion 23. The at least one first shoulder sipe 21 with such a shallow bottom portion 23 can maintain rigidity of the first shoulder land portion 11 and can improve steering stability.

As illustrated in FIG. 3, the first middle land portion 12 includes a first longitudinal edge 12a located on the first tread edge T1 side, a second longitudinal edge 12b located on the second tread edge T2 side, and a tread face between the first longitudinal edge 12a and the second longitudinal edge 12b. Further, the first middle land portion 12 is provided with only sipes. Thus, rigidity of the first middle land portion 12 can be increased. In the present embodiment, the first middle land portion 12 is provided with the plurality of first middle sipes 30 extending in the tire axial direction.

Figure 6:
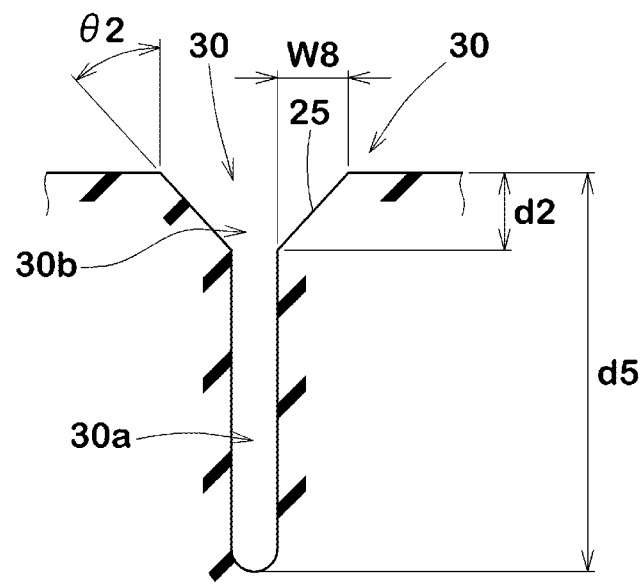
FIG. 6 is a cross-sectional view taken along the line B-B of FIG. 3.

FIG. 6 is a cross-sectional view taken along the line B-B of FIG. 3, as a cross-section of the first middle sipes 30. As illustrated in FIG. 6, each first middle sipe 30 includes a main portion 30a extending in the tire radial direction and a widening width portion 30b opening to the tread face of the land portion and having a larger width than that of the main portion 30a. In the present embodiment, a width of the main portion 30a, for example, is in a range of 0.5 to 1.5 mm.

The widening width portion 30b of each first middle sipe 30b includes a pair of inclined surfaces 25 extending from the main portion 30a. In the present embodiment, the inclined surface 25 is a flat surface, and is inclined at an angle θ2 of from 30 to 60 degrees with respect to the tire radial direction.

A depth d2 of the widening width portion 30b of each first middle sipe 30 is in a range of 15% to 30% of the maximum depth d5 of the first middle sipes 30. In addition, the depth d2 of the widening width portion 30b of each first middle sipe 30, for example, is in a range of 1.0 to 3.0 mm. In some more preferred embodiments, the depth d1 (shown in FIG. 4) of the widening width portion 21b of each first shoulder sipe 21 is smaller than the depth d2 of the widening width portion 30b of each first middle sipe 30. The depth d1 of the widening width portion 21b of each first shoulder sipe 21 is preferably in a range of 50% to 90%, more preferably 60% to 80% of the depth d2 of the widening width portion 30b of each first middle sipe 30.

A width W8 (a width along the tread face in the cross section of the sipe) of each inclined surface 25 of the widening width portion 30b of each first middle sipe 30, for example, is in a range of 1.0 to 3.0 mm.

As illustrated in FIG. 3, the first middle sipes 30 include outboard first middle sipes 31 extending from the first longitudinal edge 12a and having closed ends 31a within the first middle land portion 12, and inboard first middle sipes 32 extending from the second longitudinal edge 12b and having closed ends 32a within the first middle land portion 12.

The first middle sipes 30, in a tread plan view, extend straight. Further, the first middle sipes 30 are inclined in the first direction with respect to the tire axial direction. More specifically, the outboard first middle sipes 31 and the inboard first middle sipes 32 extend straight in a tread plan view and are inclined in the first direction with respect to the tire axial direction.

An angle of the outboard first middle sipes 31 with respect to the tire axial direction and an angle of the inboard first middle sipes 32 with respect to the tire axial direction are preferably equal to or more than 20 degrees, more preferably equal to or more than 25 degrees, but preferably equal to or less than 45 degrees, more preferably equal to or less than 40 degrees. Such outboard first middle sipes 31 and inboard first middle sipes 32 can offer a well-balanced friction force in the tire axial direction and the tire circumferential direction.

The angle difference between the outboard first middle sipes 31 and the inboard first middle sipes 32 is preferably equal to or less than 10 degrees, more preferably equal to or less than 5 degrees. In the present embodiment, the outboard first middle sipes 31 and the inboard first middle sipes 32 are arranged in parallel with each other. Such outboard first middle sipes 31 and inboard first middle sipes 32 can suppress uneven wear of the first middle land portion 12.

The outboard first middle sipes 31 and the inboard first middle sipes 32 terminate so as not to traverse the center position in the tire axial direction of the first middle land portion 12. A length La in the tire axial direction of the outboard first middle sipes 31 is equal to or more than 20%, more preferably equal to or more than 25% of a width W7 in the tire axial direction of the first middle land portion 12, but preferably equal to or less than 45%, more preferably equal to or less than 40% of the width W7. Similarly, a length Lc in the tire axial direction of the inboard first middle sipes 32 is equal to or more than 20%, more preferably equal to or more than 25% of the width W7 of the first middle land portion 12, but preferably equal to or less than 45%, more preferably equal to or less than 40% of the width W7. Such outboard first middle sipes 31 and inboard first middle sipes 32 can improve ride comfort and noise performance while maintaining steering stability.

Preferably, the outboard first middle sipes 31 and the inboard first middle sipes 32 are staggered in the tire circumferential direction from each other. Thus, in the present embodiment, in a tread plan view, virtual regions in which the outboard first middle sipes 31 are virtually expanded in parallel with the tire axial direction do not overlap with the inboard first middle sipes 32. In addition, closed ends 31a of the outboard first middle sipes 31 and closed ends 32a of the inboard first middle sipes 32 are staggered in the tire circumferential direction. A minimum distance Lb in the tire circumferential direction between the closed ends 31a of the outboard first middle sipes 31 and the closed ends 32a of the inboard first middle sipes 32, for example, is equal to or less than 50% of a pitch length P2 in the tire circumferential direction of the first middle sipes 30, more preferably in a range of 25% to 40% of the pitch length P2. In some more preferred embodiments, the distance Lb satisfies the following formula (4)

$$Lb = 2*La \pm 1 \text{ (mm)} \quad (4).$$

Thus, pitch sound of the sipes tends to become white noise, and noise performance can be improved.

Note that the pitch length P2 of the first middle sipes 30, for example, is in a range of 80% to 120% of the pitch length P1 of the first shoulder sipes 21, more preferably equal to the pitch length P1.

In the present embodiment, the outboard first middle sipes 31 are communicated with the first shoulder circumferential groove 5. Further, in a tread plan view, the widening width portions of the outboard first middle sipes 31 overlap with respective regions in which the widening width portions 21b of the first shoulder sipes 21 are expanded along the longitudinal direction thereof to the first longitudinal edge 12a. Thus, the outboard first middle sipes 31 and the first shoulder sipes 21 work together to further improve wet performance.

The first middle sipes 30 each have a constant depth in the longitudinal direction. More specifically, the outboard first middle sipes 31 and the inboard first middle sipes 32 have constant depths in the longitudinal direction. A depth of the inboard first middle sipes 32, for example, is in a range of 70% to 100% of the depth of the circumferential grooves 3. A maximum depth of the outboard first middle sipes 31 is smaller than the maximum depth of the inboard first middle sipes 32. The maximum depth of the outboard first middle sipes 31 is in a range of 30% to 70% of the maximum depth of the inboard first middle sipes 32, more preferably 1.0 to 2.5 mm.

Note that the cross-sectional shape of the sipe shown in FIG. 6 is applied to the outboard first middle sipes 31 and the inboard first middle sipes 32. Such outboard first middle sipes 31 and inboard first middle sipes 32 can generate white noise pitch sound during traveling, improving noise performance, and improving ride comfort and steering stability in a well-balanced manner.

As illustrated in FIG. 3, the first middle land portion 12, for example, is provided with at least one first longitudinal sipe 33 extending in the tire circumferential direction. In the present embodiment, the first longitudinal sipe 33 extends continuously in the tire circumferential direction. The first longitudinal sipe 33 can offer friction force in the tire axial direction when wet driving. Note that yet another embodiment of the first longitudinal sipe 33 will be described below.

The first longitudinal sipe 33, for example, is located in the central region when the first middle land portion 12 is equally divided into three regions. A distance in the tire axial direction from the first longitudinal sipe 33 to the central position in the tire axial direction of the first middle land portion 12 is preferably equal to or less than 10% of a width W7 in the tire axial direction of the first middle land portion 12, more preferably equal to or less than 5%. Such an arrangement of the first longitudinal sipe 33 can suppress uneven wear of the first middle land portion 12.

Figure 7:
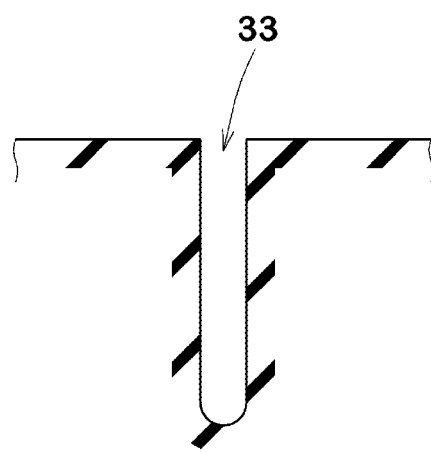
FIG. 7 is a cross-sectional view taken along the line D-D of FIG. 3.

FIG. 7 illustrates a cross-sectional view taken along the line D-D of FIG. 3. As illustrated in FIG. 7, the first longitudinal sipe 33, for example, has a constant width from the opening end to the bottom.

Figure 8:
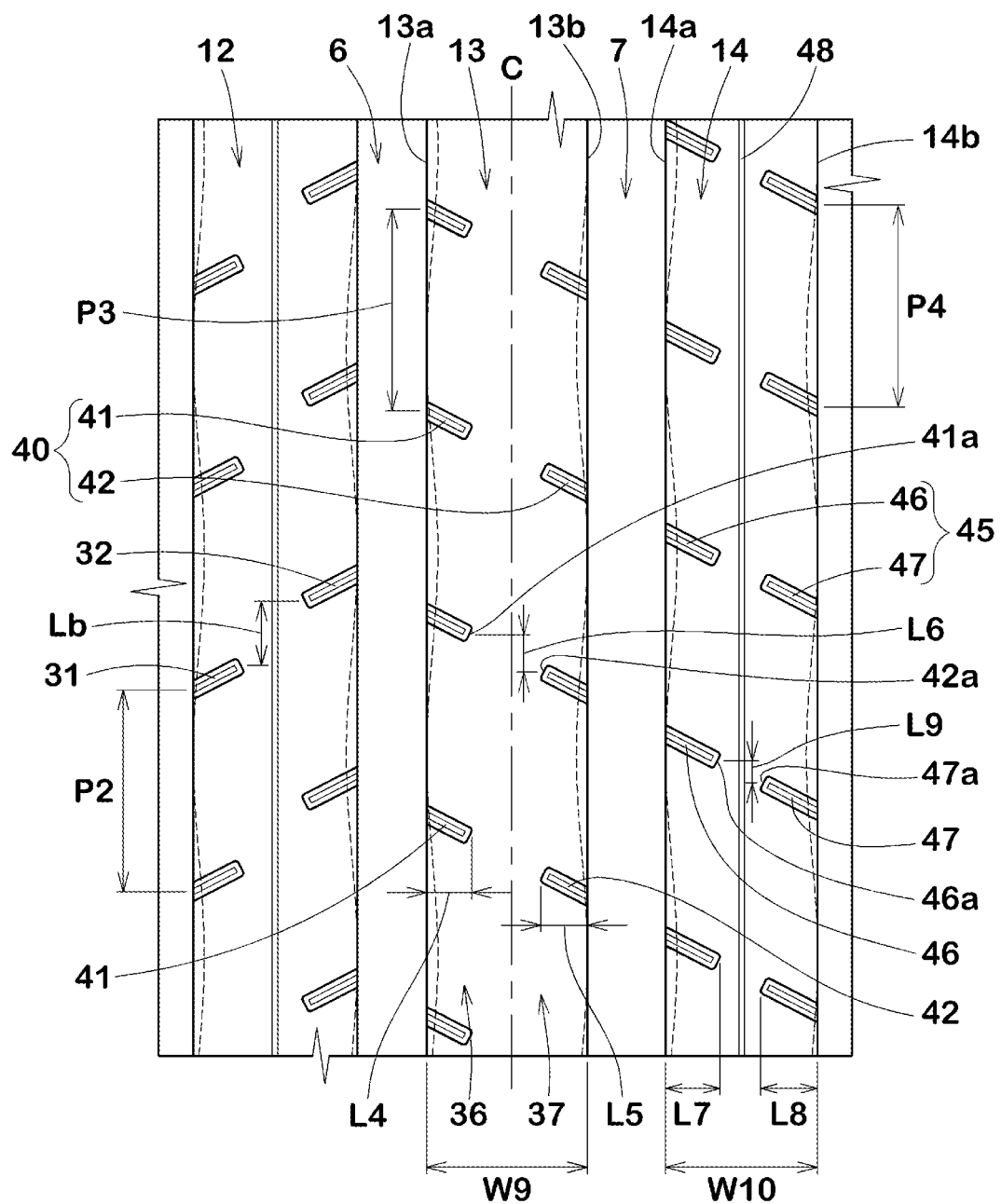
FIG. 8 is an enlarged view of the first middle land portion, a crown land portion and a second middle land portion of FIG. 1.

FIG. 8 illustrates an enlarged view of the first middle land portion 12, the crown land portion 13 and the second middle land portion 14. As illustrated in FIG. 8, the crown land portion 13 includes a first longitudinal edge 13a on the first tread edge T1 side, a second longitudinal edge 13b on the second tread edge T2 side, and a ground contact surface between the first longitudinal edge 13a and the second longitudinal edge 13b. Similarly, the second middle land portion 14 includes a first longitudinal edge 14a on the first tread edge T1 side, a second longitudinal edge 14b on the second tread edge T2 side, and a tread face between the first longitudinal edge 14a and the second longitudinal edge 14b.

As illustrated in FIG. 1, a width Wco in the tire axial direction of the outer ground contact surface 36, for example, is in a range of 51% to 60% of the width W9 in the tire axial direction of the ground contact surface of the crown land portion 13, more preferably 51% to 55%. Thus, steering stability can be improved while suppressing uneven wear of the crown land portion 13.

As illustrated in FIG. 8, the crown land portion 13 is provided with only sipes. Thus, rigidity of the crown land portion 13 can be enhanced.

The crown land portion 13 is provided with a plurality of crown sipes 40 inclined in the second direction (in each Figure, downward to the right) opposite to the first direction with respect to the tire axial direction. The crown sipes 40 according to the present embodiment extend straight. The crown sipes 40 work with the first middle sipes 30 and can improve wet performance by offering frictional forces in multiple directions.

A pitch length P3 in the tire circumferential direction of the crown sipes 40, for example, is in a range of 80% to 120% of the pitch length P2 (shown in FIG. 3) in the tire circumferential direction of the first middle sipes 30, and in the present embodiment, the pitch length P3 equals to the pitch length P2. Such a sipe arrangement can improve uneven wear resistance.

An angle of the crown sipes 40 with respect to the tire axial direction is preferably equal to or more than 20 degrees, more preferably equal to or more than 25 degrees, but preferably equal to or less than 45 degrees, more preferably equal to or less than 40 degrees. The crown sipes 40 can offer a balanced frictional force in the tire circumferential direction and the tire axial directions.

The crown sipes 40 include outboard crown sipes 41 which extend from the first longitudinal edge 13a and have closed ends 41a within the crown land portion 13 and inboard crown sipes 42 which extend from the second longitudinal edge 13b and have closed ends 42a within the crown land portion 13.

The angle difference between the outboard crown sipes 41 and the inboard crown sipes 42 is preferably equal to or more than 10 degrees, more preferably equal to or more than 5 degrees. In the present embodiment, these sipes 41 and 42 are arranged in parallel with each other. Such outboard crown sipes 41 and inboard crown sipes 42 can suppress uneven wear of the crown land portion 13.

The outboard crown sipes 41 and the inboard crown sipes 42 terminate so as not to traverse the center position in the tire axial direction of the crown land portion 13. A length L4 in the tire axial direction of the outboard crown sipes 41 and a length L5 in the tire axial direction of the inboard crown sipes 42, for example, are in a range of 20% to 35% of a width W9 in the tire axial direction of the crown land portion 13. Such outboard crown sipes 41 and inboard crown sipes 42 can improve steering stability and ride comfort in a well-balanced manner.

Preferably, the outboard crown sipes 41 and the inboard crown sipes 42 are staggered in the tire circumferential direction from each other. Preferably, in the present embodiment, in a tread plan view, virtual regions in which the outboard crown sipes 41 are expanded in parallel with the tire axial direction to the to the second longitudinal edge 13b do not overlap with the respective inboard crown sipes 42. In addition, the closed ends 41a of the outboard crown sipes 41 and the closed ends 42a of the inboard crown sipes 42 are staggered in the tire circumferential direction. Preferably, the minimum distance L6 in the tire circumferential direction between the closed ends 41a of the outboard crown sipes 41 and closed ends 42a of the inboard crown sipes 42, for example, is smaller than the minimum distance Lb in the tire circumferential direction between the closed ends 31a of the outboard first middle sipes 31 and closed ends 32a of the inboard first middle sipes 32. Specifically, the distance L6 is preferably equal to or less than 70% of the distance Lb, more preferably equal to or less than 60%, but preferably equal to or more than 30%, more preferably equal to or more than 40%. Such a sipe arrangement can make the pitch sound of the sipes white noise, improving noise performance.

The outboard crown sipes 41 and the inboard crown sipes 42 have constant depths in the longitudinal direction. A depth of the inboard crown sipes 42, for example, is in a range of 70% to 100% of the depth of the circumferential grooves 3. Further, the maximum depth of the outboard crown sipes 41 is smaller than the maximum depth of the inboard crown sipes 42. The maximum depth of the outboard crown sipes 41 is in a range of 30% to 70% of the maximum depth of the inboard crown sipes 42, and is preferably of from 1.0 to 2.5 mm.

The cross-sectional shape configuration of the first middle sipes 30 described in FIG. 6 is applied to the outboard crown sipes 41 and the inboard crown sipes 42. Thus, the description thereof is omitted herein.

The second middle land portion 14 is provided with only sipes. This can help to increase rigidity of the second middle land portion 14.

The second middle land portion 14 is provided with a plurality of second middle sipes 45 inclined in the second direction with respect to the tire axial direction. In the present embodiment, the second middle sipes 45 extends straight.

A pitch length P4 in the tire circumferential direction of the second middle sipes 45, for example, is in a range of 80% to 120% of the pitch length P3 in the tire circumferential direction of the crown sipes 40. In the present embodiment, the pitch length P4 equals to the pitch length P3. Such a sipe arrangement can improve uneven wear resistance.

An angle of the second middle sipes 45 with respect to the tire axial direction is preferably equal to or more than 20 degrees, more preferably equal to or more than 25 degrees, but preferably equal to or less than 45 degrees, more preferably equal to or less than 40 degrees. The crown sipes 40 can provide a balanced frictional force in the tire circumferential direction and the tire axial direction.

The second middle sipes 45 include outboard second middle sipes 46 which extend from the first longitudinal edge 14a and have closed ends 46a within the second middle land portion 14, and inboard second middle sipes 47 which extend from the second longitudinal edge 14b and have closed ends 47a within the second middle land portion 14.

The angle difference between the outboard second middle sipes 46 and the inboard second middle sipes 47 is preferably equal to or less than 10 degrees, more preferably equal to or less than 5 degrees. In the present embodiment, these sipes are arranged in parallel with each other. Such outboard second middle sipes 46 and inboard second middle sipes 47 can suppress uneven wear of the second middle land portion 14.

The outboard second middle sipes 46 and the inboard second middle sipes 47 terminate so as not to traverse the center position in the tire axial direction of the second middle land portion 14. A length L7 in the tire axial direction of the outboard second middle sipes 46 and a length L8 in the tire axial direction of the inboard second middle sipes 47, for example, are greater than the length L4 of the outboard crown sipes 41 and the length L5 of the inboard crown sipes 42. In addition, the length L7 in the tire axial direction of the outboard second middle sipes 46 and the length L8 in the tire axial direction of the inboard second middle sipes 47 are preferably greater than the lengths La and Lc in the tire axial direction of the first middle sipes 30. Specifically, the length L7 of the outboard second middle sipes 46 and the length L8 of the inboard second middle sipes 47 are in a range of 25% to 35% of the width W10 in the tire axial direction of the second middle land portion 14. Such outboard second middle sipes 46 and inboard second middle sipes 47 can help to improve wet performance and ride comfort.

The outboard second middle sipes 46 and the inboard second middle sipes 47 are arranged in a staggered manner in the tire circumferential direction. In the present embodiment, in a tread plan view, a virtual expanded region where each outboard second middle sipe 46 is expanded parallel to the tire axial direction to the second longitudinal edge 14b does not overlap with a respective one of the inboard second middle sipes 47, or overlaps with it in a region equal to or less than 10% of the opening area of the inboard second middle sipe 47. In addition, the closed ends 46a of the outboard second middle sipes 46 and the closed ends 47a of the inboard second middle sipes 47 are arranged in a staggered manner in the tire circumferential direction. A minimum distance L9 in the tire circumferential direction L9 between adjacent the closed ends 46a of the outboard second middle sipes 46 and the closed ends 47a of the inboard second middle sipes 47, for example, is smaller than the distance Lb in the tire circumferential direction between the closed ends 31a of the outboard first middle sipes 31 and the closed ends 32a of the inboard first middle sipes 32. Preferably, the distance L9 in the tire circumferential direction is preferably smaller than the distance L6 between the closed ends 41a of the outboard crown sipes 41 and the closed ends 42a of the inboard crown sipes 42. Specifically, the distance L9 is preferably equal to or less than 80% of the distance L6, more preferably equal to or less than 70%, but preferably equal to or more than 40%, more preferably equal to or more than 50%. Such a sipe arrangement can optimize rigidity balance of the land portions and improve steering stability and ride comfort in a well-balanced manner.

The outboard second middle sipes 46 and the inboard second middle sipes 47 have a constant width in the longitudinal direction. A depth of the inboard second middle sipes 47, for example, is in a range of 70% to 100% of the depth of the circumferential grooves 3. Further, the maximum depth of the outboard second middle sipes 46 is smaller than the maximum depth of the inboard second middle sipes 47. The maximum depth of the outboard second middle sipes 46 is in a range of 30% to 70% of the maximum depth of the inboard second middle sipes 47, and is preferably of from 1.0 to 2.5 mm. Such outboard crown sipes 41 and inboard crown sipes 42 can generate white noise pitch sound during traveling, improving noise performance, and improving ride comfort and steering stability in a well-balanced manner.

The cross-sectional shape configuration of the first middle sipes 30 described in FIG. 6 is applied to the outboard second middle sipes 46 and the inboard second middle sipes 47. Thus, the description thereof is omitted herein.

The second middle land portion 14, for example, is provided with at least one second longitudinal sipe 48 extending in the tire circumferential direction. In the present embodiment, the at least one second longitudinal sipe 48 is a single sipe that extends continuously in the tire circumferential direction. Further, the second longitudinal sipe 48 has the same cross-sectional shape as the first longitudinal sipe 33 described above. Such a second longitudinal sipe 48 can offer frictional force in the tire axial direction.

The second longitudinal sipe 48, for example, is located in the central region when the second middle land portion 14 is equally divided into three regions. A distance in the tire axial direction from the second longitudinal sipe 48 to the central position in the tire axial direction of the second middle land portion 14 is preferably equal to or less than 10% of a width W10 in the tire axial direction of the second middle land portion 14, more preferably equal to or less than 5%.

Figure 9:
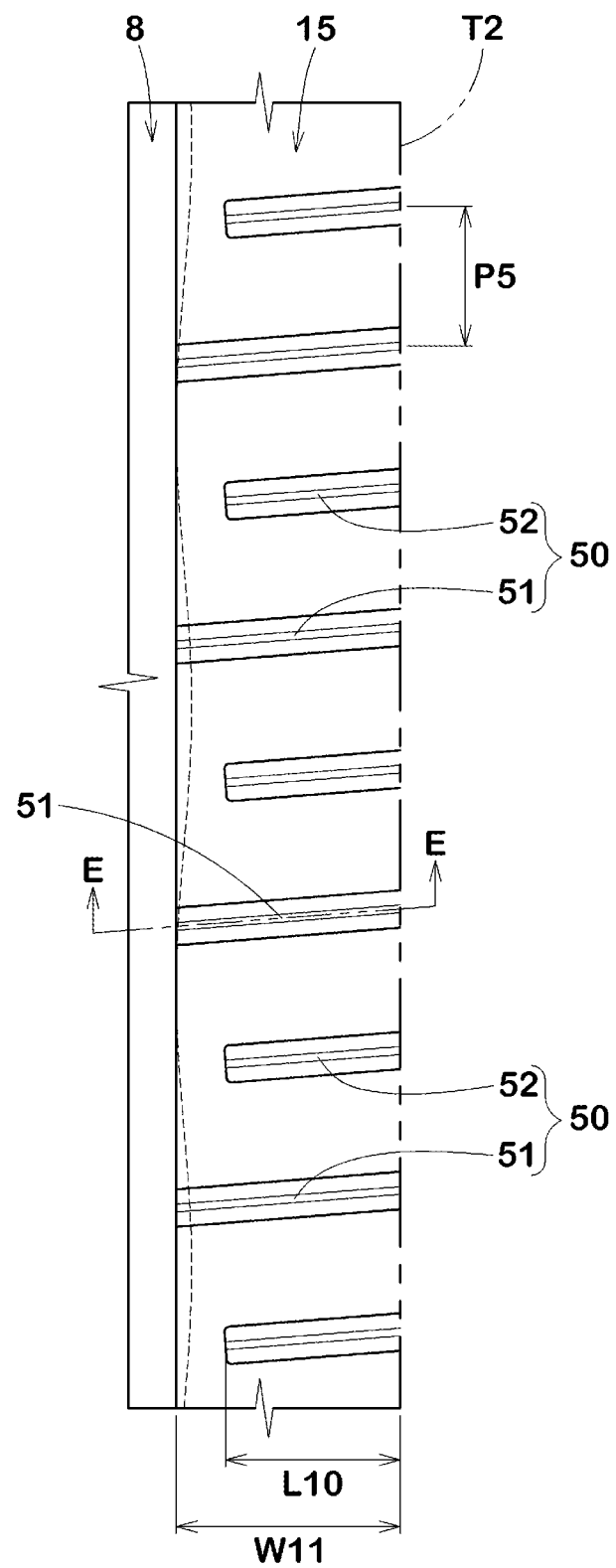
FIG. 9 is an enlarged view of a second shoulder land portion of FIG. 1.

FIG. 9 illustrates an enlarged view of the second shoulder land portion 15 of FIG. 1. As illustrated in FIG. 9, the second shoulder land portion 15 is provided with only sipes. Thus, rigidity of the second shoulder land portion 15 can be increased.

The second shoulder land portion 15, for example, is provided with a plurality of second shoulder sipes 50 extending in the tire axial direction. In the present embodiment, the total number of the second shoulder sipes 50 is greater than the total number of the first shoulder sipes 21 (shown in FIG. 3). Such a sipe arrangement can improve noise performance and wet performance of the tire.

In order to improve noise performance and wet performance while maintaining the steering stability, the total number of the second shoulder sipes 50 is preferably equal to or more than 1.3 times of the total number of the first shoulder sipes 21 (shown in FIG. 3), more preferably equal to or more than 1.5 times, still further preferably equal to or more than 1.8 times, but preferably equal to or less than 2.8 times, more preferably equal to or less than 2.5 times, still further preferably equal to or less than 2.2 times.

A pitch length P5 in the tire circumferential direction of the second shoulder sipes 50, for example, is in a range of 30% to 70% of the pitch length P4 (shown in FIG. 8) in the tire circumferential direction of the second middle sipes 45.

The second shoulder sipes 50, for example, are inclined in the first direction with respect to the tire axial direction. That is. the first shoulder sipes 21 and the second shoulder sipes 50 are inclined in the same direction as with each other with respect to the tire axial direction. In the present embodiment, the second shoulder sipes 50 extend straight.

An angle of the second shoulder sipes 50 with respect to the tire axial direction, for example, is preferably equal to or less than 20 degrees, more preferably equal to or less than 15 degrees, still further preferably equal to or less than 10 degrees. Thus, in the present embodiment, the maximum angle of the first shoulder sipes 21 with respect to the tire axial direction is greater than the maximum angle of the second shoulder sipes 50 with respect to the tire axial direction. By arranging such sipes, noise performance of the tire can further be improved.

The cross-sectional configuration of the first shoulder sipes 21 described in FIG. 4 is applied to the second shoulder sipes 50. Thus, the description thereof is omitted herein.

The second shoulder sipes 50, for example, include transverse second shoulder sipes 51 traversing the second shoulder land portion 15 entirely in the tire axial direction, and closed second shoulder sipes 52 extending in the tire axial direction from, at least, the second tread edge T2 and having closed ends within the second shoulder land portion 15.

The closed second shoulder sipes 52 have a length in the tire axial direction greater than those of the first middle sipes 30, the crown sipes 40 and the second middle sipes 45. The length L10 in the tire axial direction of the second shoulder sipes 50 is preferably equal to or more than 50% of a width W11 in the tire axial direction of the second shoulder land portion 15, more preferably equal to or more than 60%, but preferably equal to or less than 90%, more preferably equal to or less than 80%. Such closed second shoulder sipes 52 can improve ride comfort and steering stability in a well-balanced manner.

Figure 10:
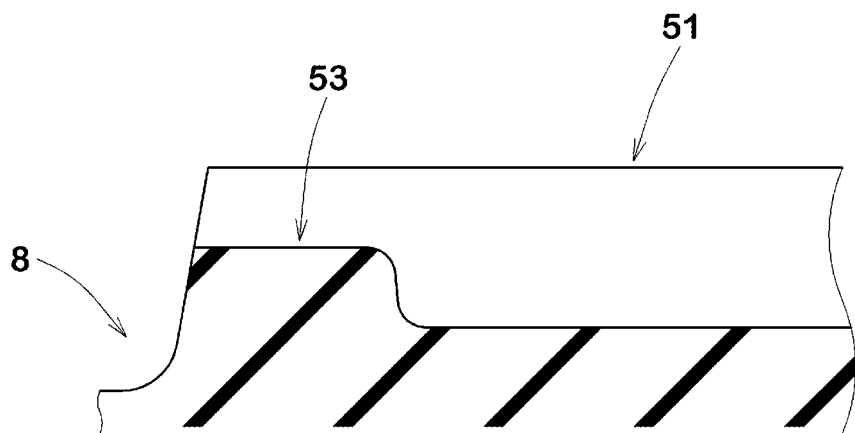
FIG. 10 is a cross-sectional view taken along the line E-E of FIG. 9.

FIG. 10 illustrates a cross-sectional view taken along the line E-E of FIG. 9. As illustrated in FIG. 10, at least one of the transverse second shoulder sipes 51 includes a shallow bottom portion 53 in which a bottom thereof is locally raised. In the present embodiment, the shallow bottom portion 53, for example, is arranged on a portion that is in communication with the second shoulder circumferential groove 8. The configuration of the shallow bottom portion 23 (shown in FIG. 5) of the first shoulder sipes 21 is applied to the shallow bottom portion 53 of the at least one second shoulder sipes 50, and the explanation thereof is omitted herein. The at least one transverse second shoulder sipe 51, including the shallow bottom portion 53, can maintain rigidity of the second shoulder land portion 15 and improve steering stability.

As illustrated in FIG. 1, in the present embodiment, the five land portions 4 are provided with only the sipes 16, and is not provided with any lateral groove for drainage. With this, the land portions can maintain high rigidity, and no pumping noise due to lateral grooves is generated so that improved noise performance of the tire can be expected.

As a more preferred embodiment, in the present embodiment, the circumferential grooves 3 each include a first groove wall 3a and a second groove wall 3b which face with each other, and the first groove wall 3a is provided with a plurality of first recesses 56 which is undercut outward in a groove width direction with respect to a groove edge of the first groove wall 3a on the ground contact surface of the tread portion 2. In addition, the second groove wall 3b is provided with a plurality of second recesses 57 which is undercut outward in the groove width direction with respect to a groove edge of the second groove wall 3b on the ground contact surface of the tread portion 2. Such first recesses 56 and the second recesses 57 can improve drainage performance of the circumferential grooves 3, suppressing hydroplaning phenomenon effectively. Further, the first recesses 56 and the second recesses 57 can also help to attenuate the sound pressure of the noise generated by the circumferential grooves 3, improving the noise performance.

Preferably, in each of the first recesses 56, an amount of undercut in the groove width direction decreases continuously from a deepest portion of each recess toward both sides in the tire circumferential direction of the recess. Similarly, in each of the second recesses 57, an amount of undercut in the groove width direction decreases continuously from a deepest portion of each recess toward both sides in the tire circumferential direction of the recess. Such first recesses 56 and second recesses 57 can prevent the formation of portions with locally reduced rigidity in the land portions and suppress uneven wear in the land portions.

In order to further improve the above-mentioned effects, it is preferable that the first recesses 56 and the second recesses 57 are alternately arranged in the tire circumferential direction.

In the present embodiment, the land portions 3 are provided with sipes communicating with the circumferential grooves 3, and the sipes are spaced at the pitch lengths in the tire circumferential direction. A length in the tire circumferential direction of the first recesses 56 and the second recesses 57 is in a range of 1.0 to 3.0 times of the pitch length of the sipes. With this, noise performance of the tire can be improved while maintaining rigidity of the land portions.

Figure 11:
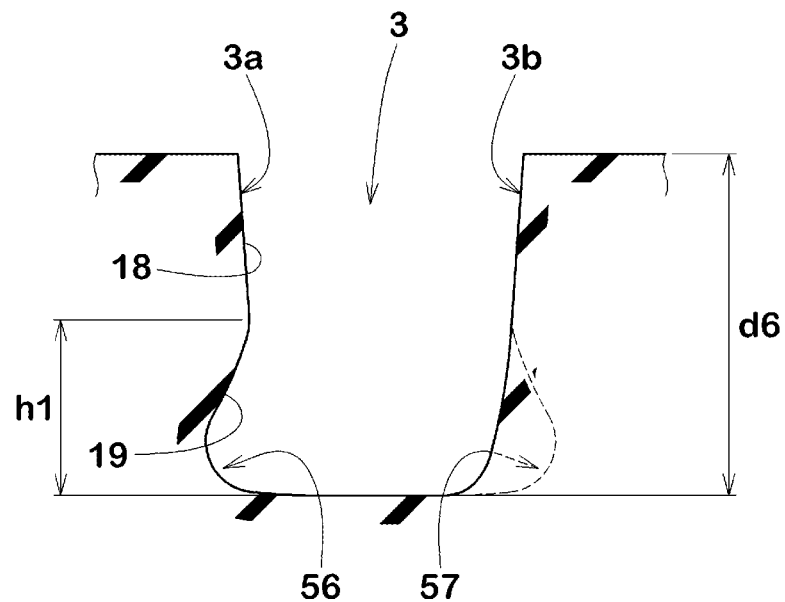
FIG. 11 is a cross-sectional view taken along the line F-F of FIG. 1.
Figure 12:
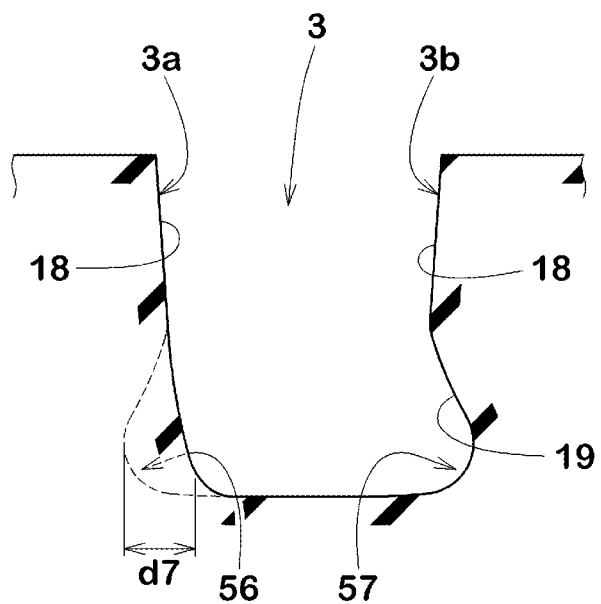
FIG. 12 is a cross-sectional view taken along the line G-G of FIG. 1.

FIG. 11 illustrates a cross-sectional view taken along the line F-F of FIG. 1. FIG. 12 illustrates a cross-sectional view taken along the line G-G of FIG. 1. As illustrated in FIG. 11 and FIG. 12, the first groove wall 3a and the second groove wall 3b have substantially the same configuration. Further, the first recesses 56 and the second recesses 57 have substantially the same configuration. The configuration of the first groove wall 3a described below is applicable to the second groove wall 3b. Furthermore, the configuration of the first recesses 56 is applied to the second recesses 57.

The first groove wall 3a includes an outer portion 18 extending from the groove edge of the circumferential groove 3 inwardly in the tire radial direction in a direction that reduces the groove width. The first groove wall 3a further includes an inner portion 19 extending from the outer portion 18 inwardly in the tire radial direction. The inner portion 19 includes a portion extending in a direction that increases the groove width and another portion that reaches a groove bottom. The inner portion 19 forms undercut bottoms of the first recesses 56.

A height h1 in the tire radial direction of the first recesses 56, for example, is in a range of from 30% to 70%, preferably 40% to 60% of the maximum depth d6 of the circumferential groove 3. The first recesses 56 can improve wet performance and noise performance of the tire while suppressing uneven wear in the land portions.

From the same point of view, an undercut amount d7 of each first recess 56, for example, is in a range of 1.0 to 3.0 mm, more preferably 1.5 to 2.5 mm. Note that an undercut amount d7 corresponds to a distance in the groove width direction (parallel to the ground contact surface) from the deepest portion of the first recess 56 to the first groove wall 3a where no first recess 56 is provided. Needless to say, the height h1 and the undercut amount d7 of the first recesses 56 described above is applied to the second recesses 57.

Hereinafter, other embodiments of the present disclosure will be described. In the Figures showing other embodiments, the elements already described are given the same reference numerals as those described above, and the above configurations is applied.

Figure 13:
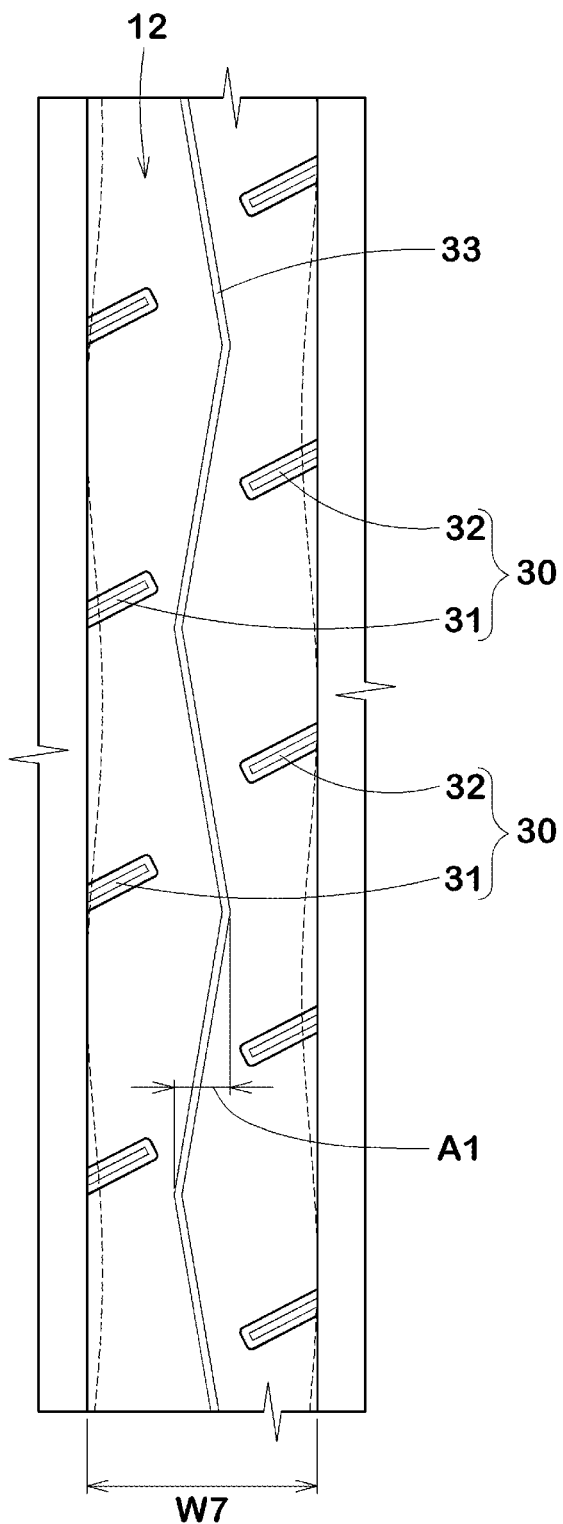
FIG. 13 is an enlarged view of the first middle land portion in accordance with another embodiment.

FIG. 13 illustrates an enlarged view of the first middle land portion 12 in accordance with another embodiment. As illustrated in FIG. 13, the first longitudinal sipe 33 provided on the first middle land portion 12 extends in a zigzag manner in tire circumferential direction. The first longitudinal sipe 33, for example, may extend in a curved or wavy manner. An amplitude amount A1 (peak-to-peak value) in the tire axial direction of the first longitudinal sipe 33, for example, may be in a range of 1.0% to 8.0% of the width W7 in the tire axial direction of the first middle land portion 12. The first longitudinal sipe 33 may extend in a zigzag manner as having a one cycle equal to two pitch lengths of the first middle sipes 30. Such a first longitudinal sipe 33 can also offer frictional force in the tire circumferential direction.

Figure 14:
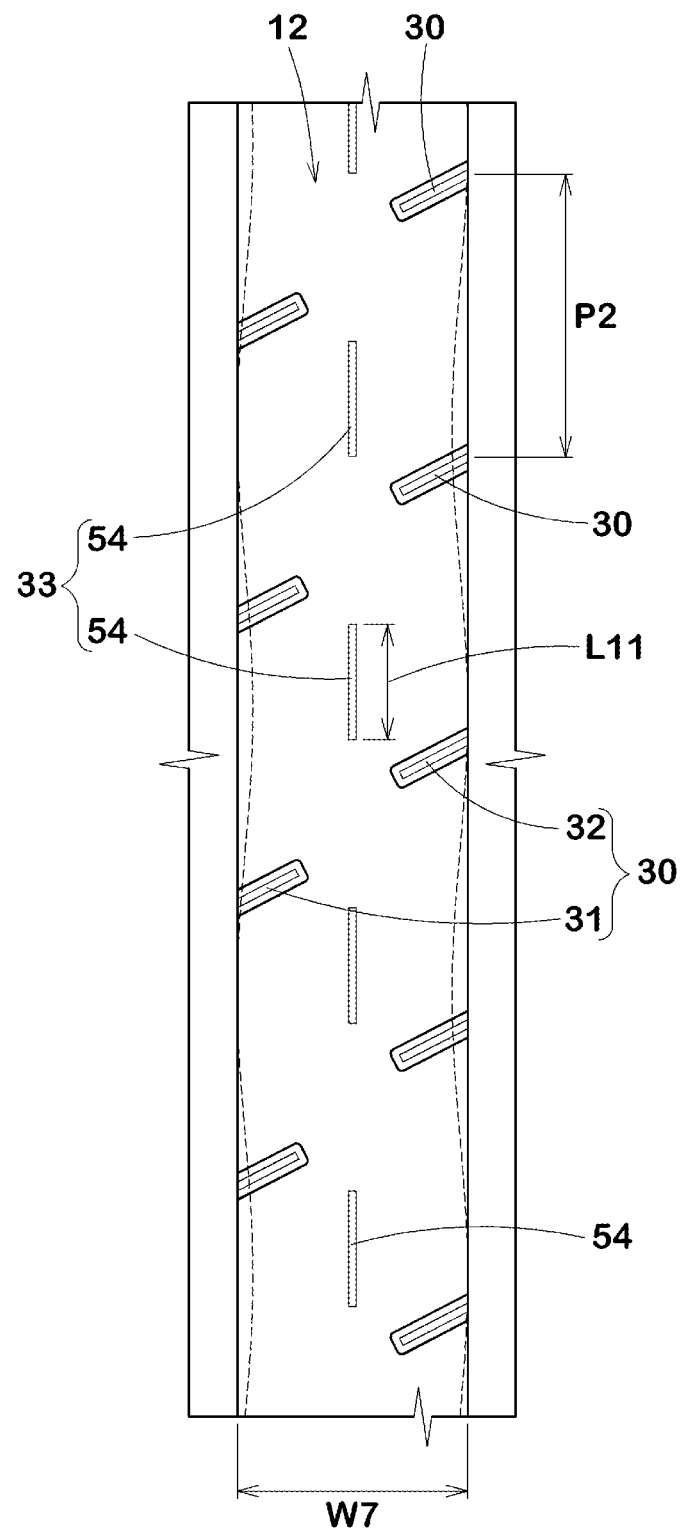
FIG. 14 is an enlarged view of the first middle land portion in accordance with yet another embodiment.

FIG. 14 illustrates an enlarged view of the first middle land portion 12 in accordance with yet another embodiment. As illustrated in FIG. 14, the at least one first longitudinal sipe 33 provided on the first middle land portion 12 includes a set of plurality of first longitudinal sipes 54 spaced in the tire circumferential direction. A length L11 in the tire circumferential direction of each first longitudinal sipe 54, for example, is in a range of 20% to 60% of the pitch length P2 in the tire circumferential direction of the first middle sipes 30. Such a first longitudinal sipe 33 can offer friction force in the tire axial direction while maintaining rigidity of the first middle land portion 12.

The configurations of the first longitudinal sipe 33 shown in FIG. 13 and FIG. 14 is also applied to the second longitudinal sipe 48 provided on the second middle land portion 14.

Figure 15:
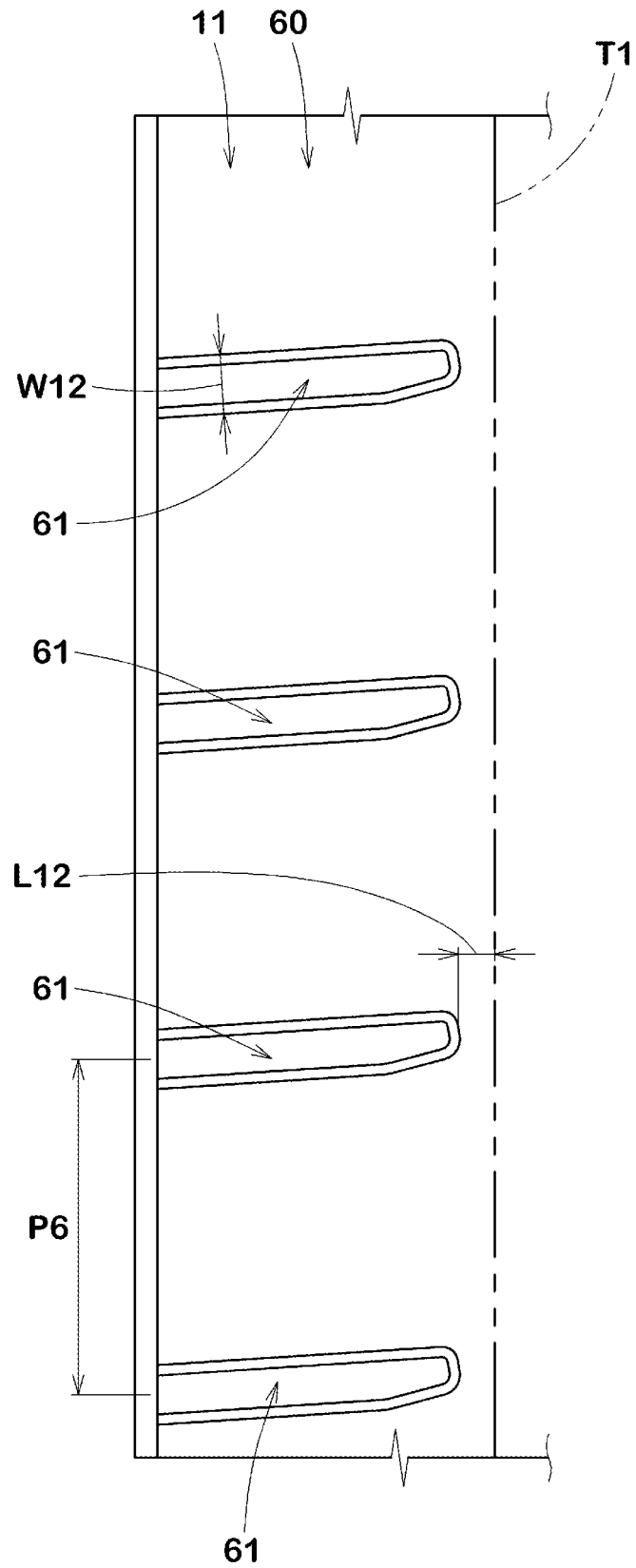
FIG. 15 is an enlarged view of a buttress surface of the first shoulder land portion in accordance with another embodiment.

FIG. 15 illustrates an enlarged view of a buttress surface 60 of the first shoulder land portion 11 in accordance with another embodiment. In FIG. 15, the tread face of the first shoulder land portion 11 is omitted. As illustrated in FIG. 15, the first shoulder land portion 11 may include the buttress surface 60 located outwardly in the tire axial direction than the first tread edge T1. In the present embodiment, the buttress surface 60 is provided with a plurality of first shoulder lateral grooves 61 extending in the tire axial direction. The first shoulder lateral grooves 61 can exhibit excellent wet performance and noise performance.

A minimum distance L12 in the tire axial direction from the first tread edge T1 to the first shoulder lateral grooves 61, for example, is equal to or less than 10 mm. The distance L12 is preferably equal to or less than 8 mm, more preferably equal to or less than 6 mm, but preferably equal to or more than 2 mm, more preferably equal to or more than 4 mm. With this, noise performance and wet performance can be improved in a well-balanced manner.

A groove width W12 of the first shoulder lateral grooves 61, for example, is in a range of 3 to 15 mm. The groove width W12 is preferably equal to or more than 5 mm, more preferably equal to or more than 7 mm, but preferably equal to or less than 13 mm, more preferably equal to or less than 11 mm. The maximum groove depth of the first shoulder lateral grooves 61 is preferably equal to or more than 50% of the maximum depth of the circumferential grooves 3, more preferably equal to or more than 60%, but preferably equal to or less than 90%, more preferably equal to or less than 80%. Such first shoulder lateral grooves 61 can improve wet performance and noise performance in a well-balanced manner.

The first shoulder lateral grooves 61, for example, are inclined with respect to the tire axial direction. An angle of the first shoulder lateral grooves 61 with respect to the tire axial direction, for example, is equal to or less than 15 degrees, more preferably equal to or less than 10 degrees.

A pitch length P6 in the tire circumferential direction of the first shoulder lateral grooves 61, for example, is in a range of 80% to 120% of the width of the tread face in the tire axial direction of the first shoulder land portion 11.

Figure 16:
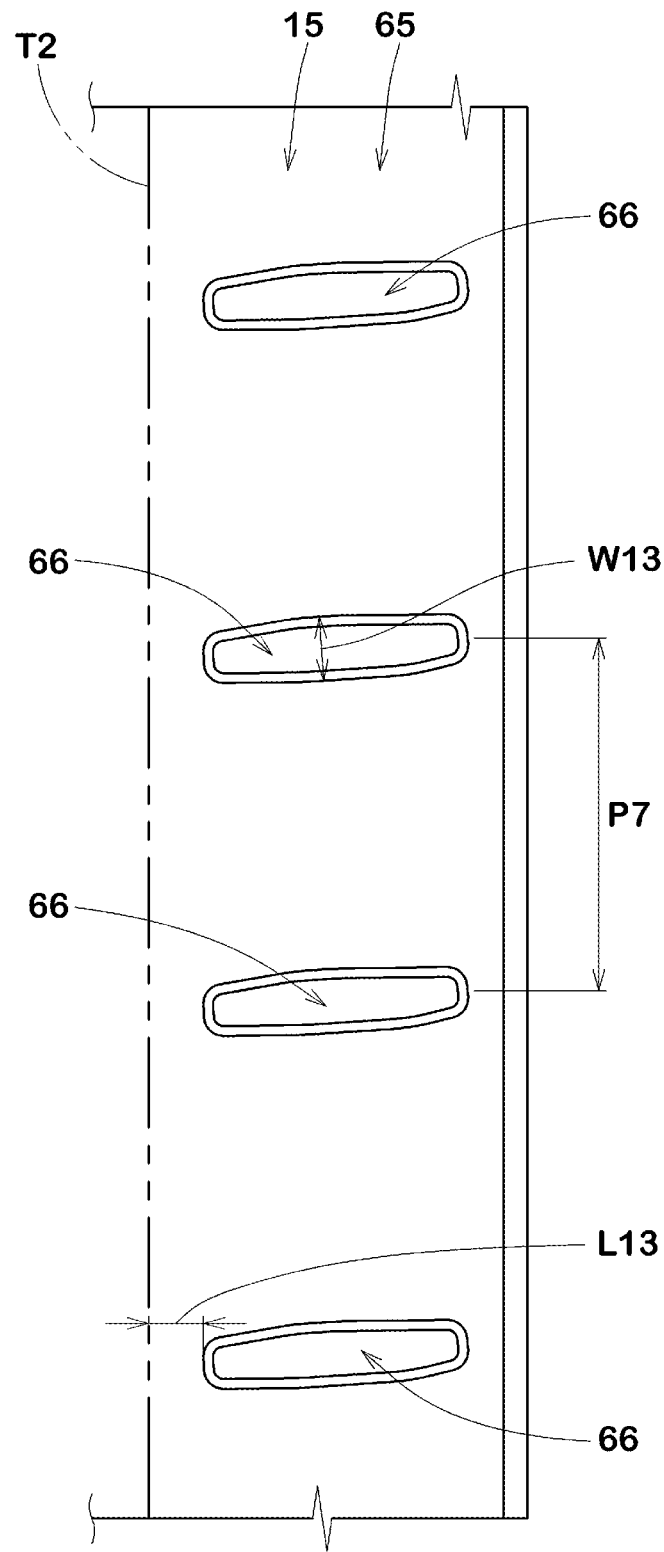
FIG. 16 is an enlarged view of a buttress surface of a second shoulder land portion in accordance with another embodiment.

FIG. 16 illustrates an enlarged view of a buttress surface 65 of the second shoulder land portion 15 in accordance with another embodiment. In FIG. 16, the tread face of the second shoulder land portion 15 is omitted. As illustrated in FIG. 16, the second shoulder land portion 15 according to the embodiment may include a buttress surface 65 located outwardly in the tire axial direction than the second tread edge T2. The buttress surface 65 is provided with a plurality of second shoulder lateral grooves 66 extending in the tire axial direction. Such second shoulder lateral grooves 66 can exhibit excellent wet performance and noise performance.

In order to improve wet performance for sure, the minimum distance L13 in the tire axial direction from the second tread edge T2 to the second shoulder lateral grooves 66, for example, is equal to or less than 10 mm. The distance L13 is preferably equal to or less than 8 mm, more preferably equal to or less than 6 mm, but preferably equal to or more than 2 mm, more preferably equal to or more than 4 mm. With this, noise performance and wet performance can be improved in a well-balanced manner.

A groove width W13 of the second shoulder lateral grooves 66, for example, is in a range of from 3 to 15 mm. In addition, the maximum depth of the second shoulder lateral grooves 66 is preferably equal to or more than 50% of the maximum depth of the circumferential grooves 3, more preferably equal to or more than 60%, but preferably equal to or less than 90%, more preferably equal to or less than 80%. Such second shoulder lateral grooves 66 can improve wet performance and noise performance in a well-balanced manner.

A pitch length P7 in the tire circumferential direction of the second shoulder lateral grooves 66, for example, is in a range of 80% to 120% of the pitch length P6 (shown in FIG. 15) in the tire circumferential direction of the first shoulder lateral grooves 61, more preferably equal to the pitch length P6.

Figure 17:
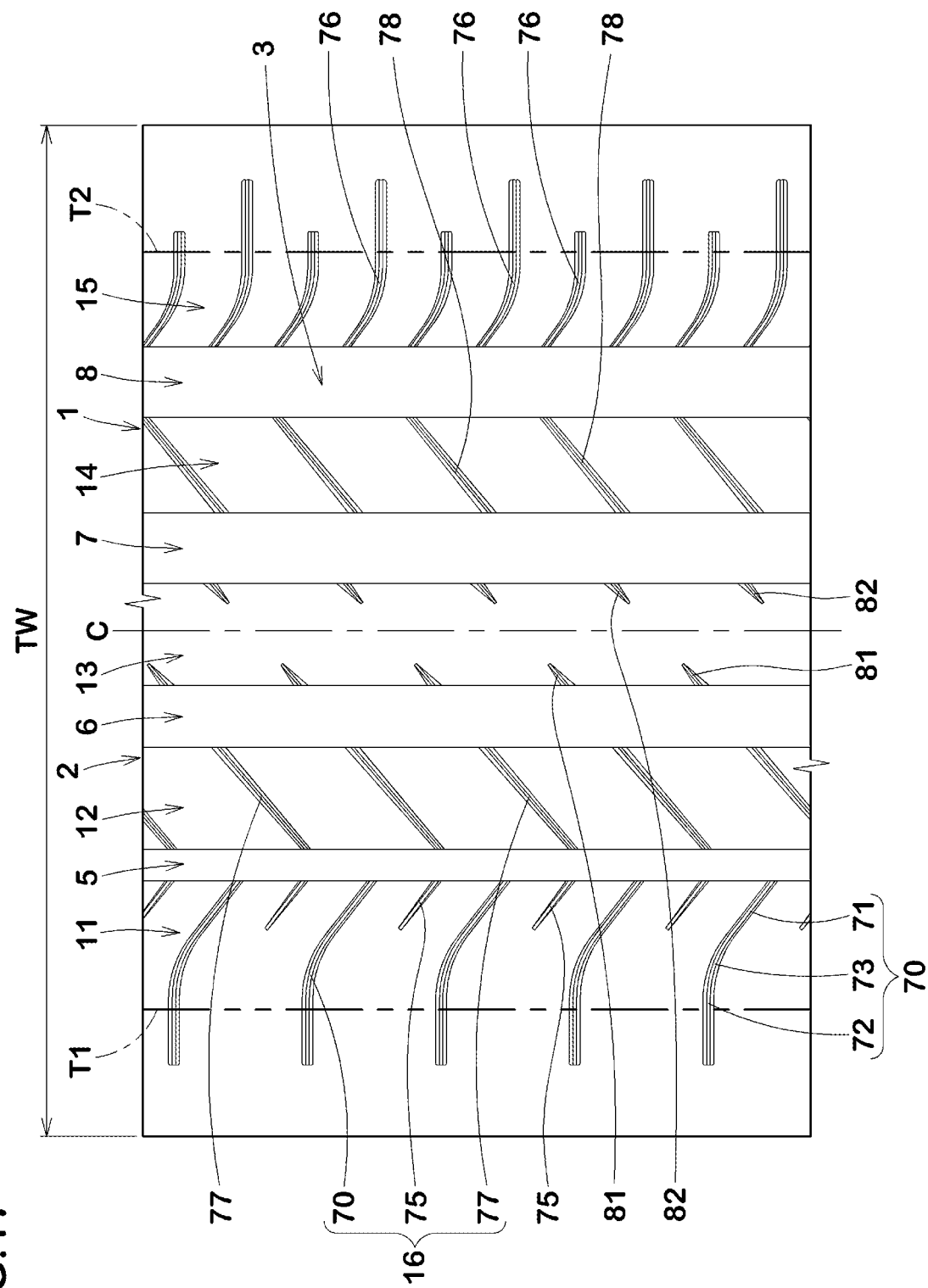
FIG. 17 is a development view of the tread portion in accordance with another embodiment.
Figure 18:
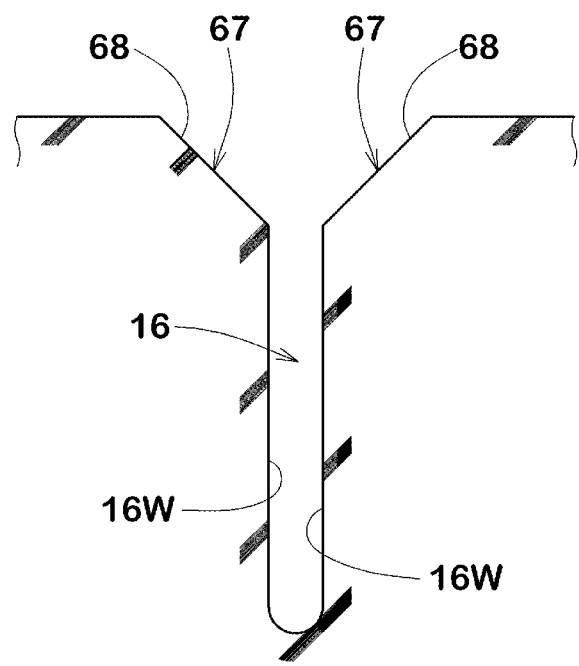
FIG. 18 is a cross-sectional view of a sipe of an embodiment shown in FIG. 17.

FIG. 17 illustrates a development view of the tread portion 2 in accordance with another embodiment. FIG. 18 illustrates a typical cross-sectional view of a sipe 16 of this embodiment. As illustrated in FIG. 18, each sipe 16 in this embodiment, for example, may be provided with a chamfered portion 67 on at least one of the pair of sipe edges. In the sipe 16 according to this embodiment, both sipes edges are provided with the chamfered portions 67. In the following, such a sipe 16 may be referred to as "chamfered sipe".

Each chamfered portion 67 includes an inclined surface 68 which connects the ground contact surface and a sipe wall 16w. An angle of the inclined surface 68 with respect to the depth direction of the sipe 16, for example, is 30 to 60 degrees.

As illustrated in FIG. 17, the first shoulder land portion 11 according to this embodiment is provided with a plurality of first shoulder sipes 70 extending from the first shoulder circumferential groove 5 to a location beyond the first tread edge T1. Preferably, each of the first shoulder sipes 70, for example, includes an inclined portion 71 extending from the first shoulder circumferential groove 5 obliquely with respect to the tire axial direction, an axial portion 72 having an angle with respect to the tire axial direction smaller than that of the inclined portion 71 and equal to or less than 10 degrees, and a curved portion 73 connecting between the inclined portion 71 and the axial portion 72 while curving.

The first shoulder sipes 70 are configured as the above-mentioned chamfered sipes whose both sipe edges are formed by the chamfer portions over the entire length. In addition, in a tread plan view, a width of the chamfered portions of the first shoulder sipes 70 increases outwardly in the tire axial direction. Specifically, in each sipe, the chamfer portion extending on the inclined portion 71 and the axial portion 72 has a constant width, and the chamfered portion extending on the curved portion 73 has a width increasing outwardly in the tire axial direction. Thus, in a tread plan view, a width of the chamfered portions on the axial portion 72 is greater than a width of the inclined portions 71 and the chamfered portion. Specifically, a width of the chamfered portions on the axial portion 72 is preferably in a range of 1.5 to 2.5 times of a width of the chamfered portions on the inclined portion 71. The first shoulder sipes 70 having such chamfered portions can effectively suppress uneven wear near the first tread edge T1. Needless to say, a width of the chamfered portion described above means the width in the direction perpendicular to the length direction of the sipe in a tread plan view.

The first shoulder land portion 11 according to this embodiment is provided with a plurality of shoulder closed sipes 75 extending from the first shoulder circumferential groove 5, and terminating without reaching the first tread edge T1. The shoulder closed sipes 75, for example, are preferably configured as chamfered sipes. A width of the chamfered portions of the shoulder closed sipes 75 decreases outwardly in the tire axial direction from the first shoulder circumferential groove 5 side.

The second shoulder land portion 15 according to this embodiment is provided with a plurality of second shoulder sipes 76 which has the same configuration as the first shoulder sipes 70 described above, and thus the explanation thereof is omitted herein.

The first middle land portion 12 according to this embodiment is provided with a plurality of first middle sipes 77. The first middle sipes 77 traverse the first middle land portion 12 in the tire axial direction entirely and are inclined with respect to the tire axial direction.

The first middle sipes 77, for example, are configured as the chamfered sipes. Specifically, both sipe edges of the first middle sipes 77 are formed by the chamfered portion over the entire length. In addition, in a tread plan view, a width of the chamfered portions of the first middle sipes 77 increases toward the tire equator C continuously. With this, at the end of the first middle sipes 77 on the tire equator C side, a width of the chamfered portions is maximized. Also, in a more preferred embodiment, the maximum width of the chamfered portions of the first middle sipes 77 is greater than the maximum width of the chamfered portions of the inclined portions 71 of the first shoulder sipes 70. This embodiment can improve steering stability and noise performance while suppressing uneven wear of the first middle land portion 12.

The second middle land portion 14 is provided with a plurality of second middle sipes 78. The configuration of the first middle sipes 77 described above is applied to the second middle sipes 78, and the explanation here is omitted.

The crown land portion 13 is provided with a plurality of first crown sipes 81 and a plurality of second crown sipes 82. The first crown sipes 81, for example, extend from the first crown circumferential groove 6 and terminating within the crown land portion 13. The second crown sipes 82, for example, extend from the second crown circumferential groove 7 and terminating within the crown land portion 13.

The first crown sipes 81 and the second crown sipes 82 are configured as the chamfered sipes. In some more preferred embodiments, a width of the chamfered portions of the first crown sipes 81 and the second crown sipes 82 decreases toward the tire equator C. Such first crown sipes 81 and second crown sipes 82 can suppress uneven wear of the crown land portion 13.

While the particularly preferable embodiments of the tire in accordance with the present disclosure have been described in detail, the present disclosure is not limited to the illustrated embodiments, but can be modified and carried out in various aspects within the scope of the disclosure.

WORKING EXAMPLE

Figure 19:
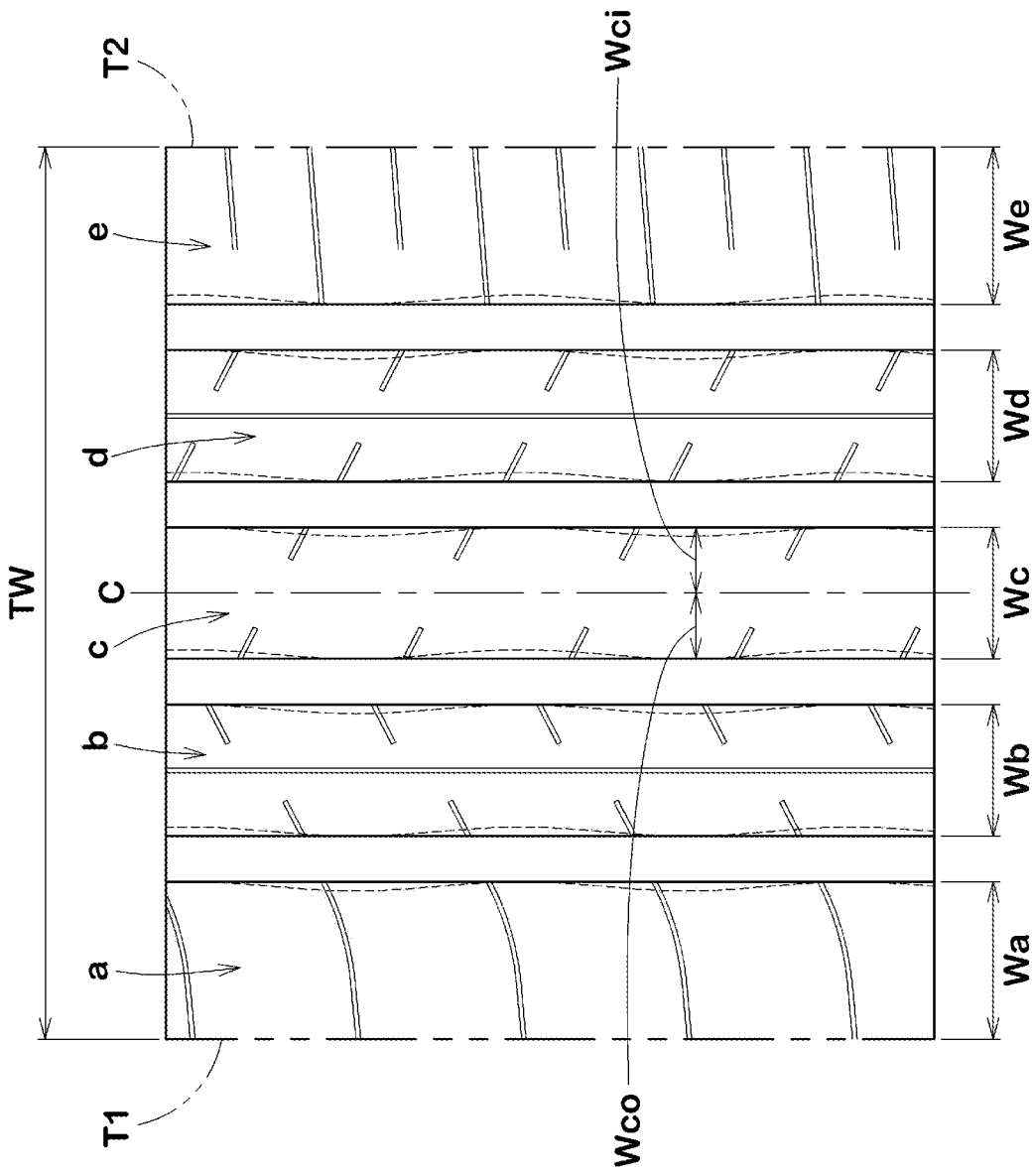
FIG. 19 is a development view of the tread portion of a standard tire.

Tires having a size of 235/55R19 with the basic pattern of FIG. 1 were prepared based on the specifications in Tables 1 to 3. As a reference tire for comparing noise performance, a tire with the pattern shown in FIG. 19 was also prepared.

The land portions of the reference tire are provided with sipes shown in FIG. 1, but the widening width portions are removed therefrom. Further, for the reference tire, the width Wa of the first shoulder land portion (a) and the width We of the second shoulder land portion (e) are the same. Furthermore, the width Wb of the first middle land portion (b), the width Wc of the crown land portion (c), and the width Wd of the second middle land portion (d) are the same. The widths Wa and We are greater than the widths Wb, Wc and Wd. Thus, the reference tire, under the 50% loaded condition, the first shoulder land portion (a), the first middle land portion (b), the crown land portion (c), the second middle land portion (d) and the second shoulder land portion (e) respectively have widths W1$s$, W1$m$, Wc, W2$m$ and W2$s$ of ground contact surfaces in the tire axial direction, and the widths W1$s$, W1$m$, Wc, W2$m$ and W2$s$ satisfy the following formula (5)

$$W1s = W2s > W1m = Wc = W2m \qquad (5).$$

In addition, the width Wco of the outer ground contact surface and the width Wci of the inner ground contact surface of the crown land portion (c) are the same.

Figure 20:
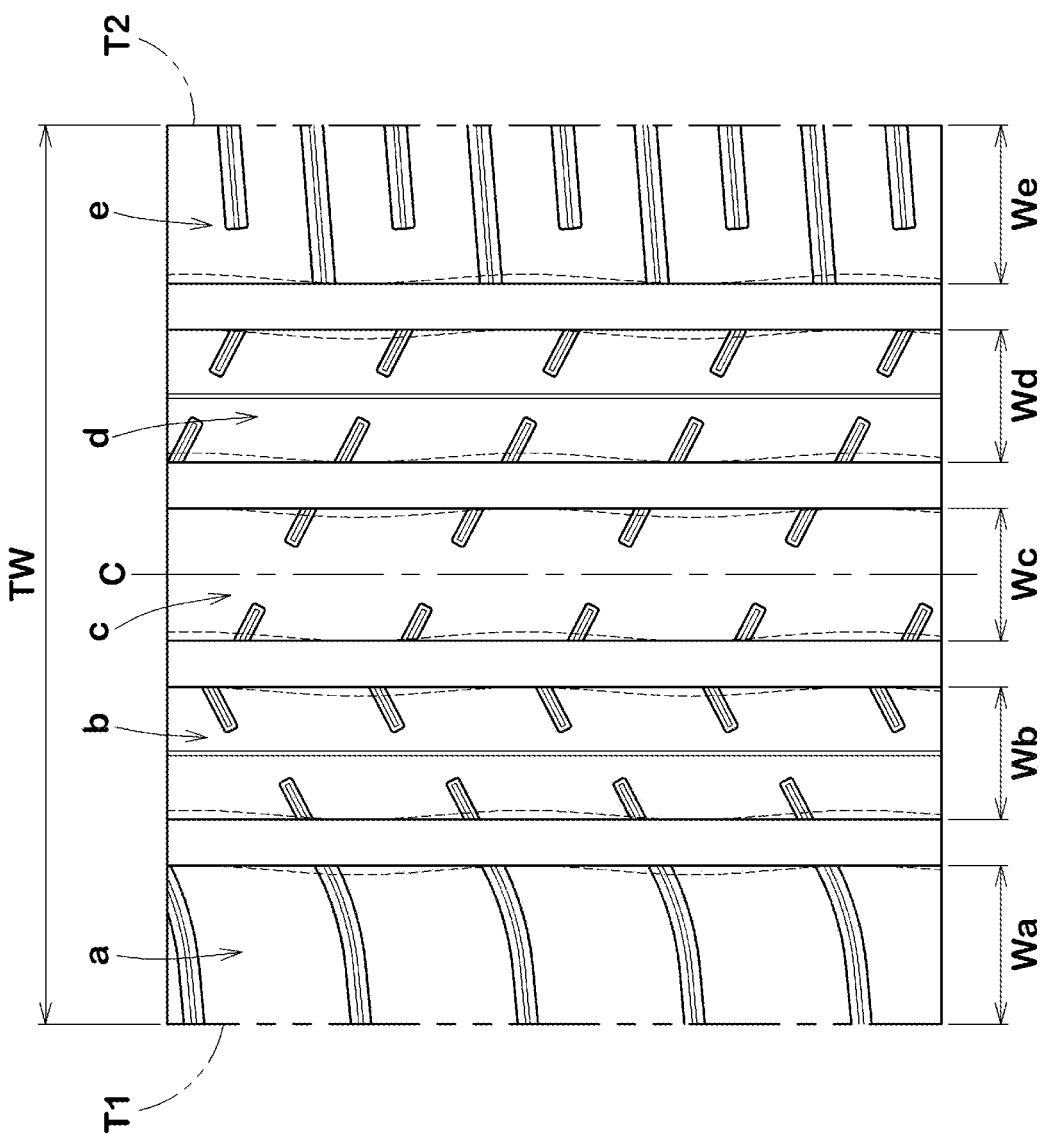
FIG. 20 is a development view of the tread portion of comparative example.

In addition, as a comparative example, a tire with the pattern shown in FIG. 20 was also prepared. The tire of the comparative example has the same widths of the land portions as the reference tires, and each sipe has a widening width portion as shown in FIG. 1. The tire of the comparative example is substantially the same as those shown in FIG. 1, except for the above structure. Then, steering stability on dry roads and noise performance of the test tires were tested. The common specifications and test methods for the test tires are as follows.

Rim: 19×7.0 J
Tire inner pressure: 230 kPa
Test vehicle: four-wheel-drive vehicle with 2000 cc displacement
Tire location: all wheels Steering Stability on Dry Roads Test:

Steering stability on dry roads when driving on a general road with the above test vehicle was evaluated by the driver's sensuality. The test results are shown in Tables using a score with the steering stability of the comparative example as 100. The higher the number, the better the steering stability on dry roads.

Noise Performance Test:

The above test vehicle was made to run on a dry road surface at 40 to 100 km/h, and the maximum sound pressure of noise inside the vehicle was measured. The test results are shown using an index of the amount of sound pressure reduction of the comparative example is set to 100, where the amount of sound pressure reduction is the difference from the sound pressure of the reference tire. The larger the index is, the smaller the maximum sound pressure of the noise is, and the better the noise performance is exhibited.

Tables 1 to 3 show the test results.

TABLE 1

| | Comparative Ex. | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Figure showing tread pattern | FIG. 20 | FIG. 1 | FIG. 1 | FIG. 1 | FIG. 1 | FIG. 1 | FIG. 1 | FIG. 1 | FIG. 1 |
| Width W1$m$ of first middle land portion/width of crown land portion (%) | 100 | 102 | 101 | 103 | 105 | 107 | 102 | 102 | 102 |
| Width W2$m$ of second middle land portion/width of crown land portion (%) | 100 | 95 | 95 | 95 | 95 | 95 | 90 | 93 | 97 |
| Width Wco of outboard ground contact surface/width of crown land portion (%) | 50 | 53 | 53 | 53 | 53 | 53 | 53 | 53 | 53 |
| Height h1 of first and second recesses/maximum depth d6 of circumferential grooves (%) | 50 | 50 | 50 | 50 | 50 | 50 | 50 | 50 | 50 |
| Undercut depth d7 of first and second recesses (mm) | 2.0 | 2.0 | 2.0 | 2.0 | 2.0 | 2.0 | 2.0 | 2.0 | 2.0 |
| Length of first and second recesses/pitch of sipes | 2.0 | 2.0 | 2.0 | 2.0 | 2.0 | 2.0 | 2.0 | 2.0 | 2.0 |
| Steering stability on dry road (score) | 100 | 110 | 105 | 108 | 110 | 111 | 107 | 109 | 110 |
| Noise performance (index) | 100 | 113 | 114 | 113 | 110 | 107 | 115 | 113 | 110 |

TABLE 2

|  | Ex. 9 | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- | --- |
| Figure showing tread pattern | FIG. 1 | FIG. 1 | FIG. 1 | FIG. 1 | FIG. 1 | FIG. 1 | FIG. 1 | FIG. 1 | FIG. 1 |
| Width W1m of first middle land portion/width of crown land portion (%) | 102 | 102 | 102 | 102 | 102 | 102 | 102 | 102 | 102 |
| Width W2m of second middle land portion/width of crown land portion (%) | 99 | 95 | 95 | 95 | 95 | 95 | 95 | 95 | 95 |
| Width Wco of outboard ground contact surface/width of crown land portion (%) | 53 | 51 | 55 | 57 | 60 | 53 | 53 | 53 | 53 |
| Height h1 of first and second recesses/maximum depth d6 of circumferential grooves (%) | 50 | 50 | 50 | 50 | 50 | 30 | 40 | 60 | 70 |
| Undercut depth d7 of first and second recesses (mm) | 2.0 | 2.0 | 2.0 | 2.0 | 2.0 | 2.0 | 2.0 | 2.0 | 2.0 |
| Length of first and second recesses/pitch of sipes | 2.0 | 2.0 | 2.0 | 2.0 | 2.0 | 2.0 | 2.0 | 2.0 | 2.0 |
| Steering stability on dry road (score) | 110 | 109 | 110 | 110 | 111 | 110 | 110 | 108 | 106 |
| Noise performance (index) | 107 | 113 | 113 | 110 | 107 | 110 | 112 | 113 | 114 |

TABLE 3

|  | Ex. 18 | Ex. 19 | Ex. 20 | Ex. 21 | Ex. 22 | Ex. 23 | Ex. 24 | Ex. 25 |
| --- | --- | --- | --- | --- | --- | --- | --- | --- |
| Figure showing tread pattern | FIG. 1 | FIG. 1 | FIG. 1 | FIG. 1 | FIG. 1 | FIG. 1 | FIG. 1 | FIG. 1 |
| Width W1m of first middle land portion/width of crown land portion (%) | 102 | 102 | 102 | 102 | 102 | 102 | 102 | 102 |
| Width W2m of second middle land portion/width of crown land portion (%) | 95 | 95 | 95 | 95 | 95 | 95 | 95 | 95 |
| Width Wco of outboard ground contact surface/width of crown land portion (%) | 53 | 53 | 53 | 53 | 53 | 53 | 53 | 53 |
| Height h1 of first and second recesses/maximum depth d6 of circumferential grooves (%) | 50 | 50 | 50 | 50 | 50 | 50 | 50 | 50 |
| Undercut depth d7 of first and second recesses (mm) | 1.0 | 1.5 | 2.5 | 3.0 | 2.0 | 2.0 | 2.0 | 2.0 |
| Length of first and second recesses/pitch of sipes | 2.0 | 2.0 | 2.0 | 2.0 | 1.0 | 1.5 | 2.5 | 3.0 |
| Steering stability on dry road (score) | 110 | 110 | 108 | 105 | 108 | 109 | 110 | 111 |
| Noise performance (index) | 110 | 111 | 114 | 115 | 113 | 113 | 111 | 109 |

From the test results, it was confirmed that steering stability on dry roads of the example tires was improved. It was also confirmed that the example tires also improved noise performance.

[Additional Notes]

The following clauses are disclosed regarding the above-described embodiments.

[Clause 1]

A tire comprising:
a tread portion having a designated mounting direction to a vehicle, the tread portion comprising a first tread edge located outside of a vehicle when mounted on the vehicle, a second tread edge located inside of a vehicle when mounted on the vehicle, a plurality of circumferential grooves extending continuously in the tire circumferential direction between the first tread edge and the second tread edge, and a plurality of land portions divided by the plurality of circumferential grooves,
wherein
the plurality of land portions comprises a crown land portion located on the tire equator, a first middle land portion adjacent to the crown land portion on the first tread edge side, and a second middle land portion adjacent to the crown land portion on the second tread edge side,
under a 50% loaded condition in which the tire is mounted onto a standard wheel rim with a standard pressure and grounded to a plane with a 50% tire load of a standard tire load at zero camber angles, the first middle land portion, the crown land portion, and the second middle land portion respectively have widths W1$m$, Wc, and W2$m$ of ground contact surfaces in a tire axial direction, the widths W1$m$, Wc, and W2$m$ satisfying the following formula (1)

$$W1m > Wc > W2m \tag{1},$$

the crown land portion comprises an outer ground contact surface located on the first tread edge side with respect to the tire equator, and an inner ground contact surface located on the second tread edge side with respect to the tire equator, and
the outer ground contact surface and the inner ground contact surface respectively have widths Wco and Wci in the tire axial direction, the widths Wco and Wci satisfying the following formula (2)

$$Wco > Wci \tag{2}.$$

[Clause 2]

The tire according to clause 1, wherein
the width Wco in the tire axial direction of the outer ground contact surface is in a range of 51% to 55% of the width Wc in the tire axial direction of the crown land portion.

[Clause 3]

The tire according to clause 1 or 2, wherein
the first middle land portion is provided with at least one first longitudinal sipe extending in the tire circumferential direction.

[Clause 4]
The tire according to clause 3, wherein the at least one first longitudinal sipe extends continuously in the tire circumferential direction.

[Clause 5]
The tire according to clause 4, wherein the at least one first longitudinal sipe extends in a zigzag manner.

[Clause 6]
The tire according to clause 3, wherein the at least one first longitudinal sipe comprises a set of plurality of first longitudinal sipes spaced in the tire circumferential direction.

[Clause 7]
The tire according to any one of clauses 1 to 6, wherein the first middle land portion comprises
a first longitudinal edge located on the first tread edge side,
a second longitudinal edge located on the second tread edge side, and
the ground contact surface between the first longitudinal edge and the second longitudinal edge, and
the first middle land portion is provided with
outboard first middle sipes communicating with the first longitudinal edge and having closed ends within the first middle land portion, and
inboard first middle sipes communicating with the second longitudinal edge and having closed ends within the first middle land portion.

[Clause 8]
The tire according to clause 7, wherein a length in the tire axial direction of the outboard first middle sipes is in a range of 20% to 45% of a width in the tire axial direction of the first middle land portion.

[Clause 9]
The tire according to clause 7 or 8, wherein a length in the tire axial direction of the inboard first middle sipes is in a range of 20% to 45% of a width in the tire axial direction of the first middle land portion.

[Clause 10]
The tire according to any one of clauses 1 to 9, wherein the plurality of circumferential grooves each comprises a first groove wall and a second groove wall which face with each other,
the first groove wall is provided with a plurality of first recesses being undercut outward in a groove width direction with respect to a groove edge of the first groove wall on a ground contact surface of the tread portion,
the second groove wall is provided with a plurality of second recesses being undercut outward in the groove width direction with respect to a groove edge of the second groove wall on a ground contact surface of the tread portion,
in each of the first recesses and the second recesses, an amount of undercut in the groove width direction decreases continuously from a deepest portion of each recess toward both sides thereof in the tire circumferential direction,
the plurality of land portions adjacent to the plurality of circumferential grooves is provided with sipes communicating with the plurality of circumferential grooves, the sipes being spaced at a pitch in the tire circumferential direction, and
a length in the tire circumferential direction of the first recesses and the second recesses is in a range of 1.0 to 3.0 times of the pitch of the sipes.

[Clause 11]
The tire according to clause 1, wherein the plurality of land portions comprises a first shoulder land portion comprising the first tread edge and a buttress surface located outwardly in the tire axial direction than the first tread edge, and
the buttress surface is provided with a plurality of first shoulder lateral grooves extending in the tire axial direction.

[Clause 12]
The tire according to clause 11, wherein a minimum length in the tire axial direction from the first tread edge to the plurality of first shoulder lateral grooves is equal to or less than 10 mm.

[Clause 13]
The tire according to clause 11 or 12, wherein a groove width of the plurality of first shoulder lateral grooves is in a range of 3 to 15 mm.

[Clause 14]
The tire according to any one of clauses 11 to 13, wherein a maximum depth of the plurality of first shoulder lateral grooves is in a range of 50% to 90% of a maximum depth of the plurality of circumferential grooves.

[Clause 15]
The tire according to any one of clauses 11 to 14, wherein the plurality of land portions comprises a second shoulder land portion comprising the second tread edge and a buttress surface located outwardly in the tire axial direction than the second tread edge, and
the buttress surface of the second shoulder land portion is provided with a plurality of second shoulder lateral grooves extending in the tire axial direction.

[Clause 16]
The tire according to clause 1, wherein the plurality of land portions is provided with a plurality of sipes,
the plurality of sipes comprises at least one chamfered sipe in which at least one sipe edge is formed by a chamfered portion, and
the chamfered portion comprises an inclined surface that connects a ground contact surface of the land portion and a sipe wall.

[Clause 17]
The tire according to clause 16, wherein the plurality of land portion comprises a first shoulder land portion comprising the first tread edge,
the plurality of circumferential grooves comprises a first shoulder circumferential groove adjacent to the first shoulder land portion,
the first shoulder land portion is provided with a plurality of first shoulder sipes extending from the first shoulder circumferential groove to a location beyond the first tread edge,
each of the plurality of first shoulder sipes is formed as the chamfered sipe,
each of the plurality of first shoulder sipes comprises an inclined portion extending from the first shoulder circumferential groove and is inclined at an angle with respect to the tire axial direction, and an axial portion having an angle with respect to the tire axial direction smaller than that of the inclined portion and equal to or less than 10 degrees, and
in a tread plan view, a width of the chamfered portion of the axial portion is greater than a width of the chamfered portion of the inclined portion.

[Clause 18]
The tire according to clause 17, wherein
each of the plurality of first shoulder sipes comprises a curved portion extending in a curved manner between the inclined portion and the axial portion, and
in a tread plan view, a width of the chamfered portion of the curved portion increases outwardly in the tire axial direction.

[Clause 19]
The tire according to any one of clauses 16 to 18, wherein
the first middle land portion is provided with a plurality of first middle sipes traversing the first middle land portion entirely in the tire axial direction,
each of the first middle sipes is formed as the chamfered sipe, and
in a tread plan view, a width of the chamfered portion of each of the first middle sipes increases continuously toward the tire equator.

[Clause 20]
The tire according to any one of clauses 16 to 19, wherein
the second middle land portion is provided with a plurality of second middle sipes traversing the second middle land portion entirely in the tire axial direction,
each of the plurality of second middle sipes is formed as the chamfered sipe, and
in a tread plan view, a width of the chamfered portion of each of the second middle sipe increases continuously toward the tire equator.

The invention claimed is:

1. A tire comprising:
a tread portion having a designated mounting direction to a vehicle, the tread portion comprising a first tread edge located outside of a vehicle when mounted on the vehicle, a second tread edge located inside of a vehicle when mounted on the vehicle, a plurality of circumferential grooves extending continuously in the tire circumferential direction between the first tread edge and the second tread edge, and a plurality of land portions divided by the plurality of circumferential grooves,
wherein
the plurality of land portions comprises a crown land portion located on the tire equator, a first middle land portion adjacent to the crown land portion on the first tread edge side, a second middle land portion adjacent to the crown land portion on the second tread edge side, and a first shoulder land portion adjacent to the first middle land portion on the first tread edge side,
under a 50% loaded condition in which the tire is mounted onto a standard wheel rim with a standard pressure and grounded to a plane with a 50% tire load of a standard tire load at zero camber angles, the first middle land portion, the crown land portion, and the second middle land portion respectively have widths $W1m$, $Wc$, and $W2m$ of ground contact surfaces in a tire axial direction, the widths $W1m$, $Wc$, and $W2m$ satisfying the following formula (1)

$$W1m > Wc > W2m \quad (1),$$

the crown land portion comprises an outer ground contact surface located on the first tread edge side with respect to the tire equator, and an inner ground contact surface located on the second tread edge side with respect to the tire equator,
the outer ground contact surface and the inner ground contact surface respectively have widths $Wco$ and $Wci$ in the tire axial direction, the widths $Wco$ and $Wci$ satisfying the following formula (2)

$$Wco > Wci \quad (2),$$

the first middle land portion is provided with a plurality of first middle sipes extending in the tire axial direction,
each first middle sipe includes a main portion extending in the tire radial direction and a widening width portion opening to a tread face of the first middle land portion and having a larger width than that of the main portion,
the first shoulder land portion is provided with a plurality of first shoulder sipes extending in the tire axial direction,
each first shoulder sipe includes a main portion extending in the tire radial direction and a widening width portion opening to a tread face of the first shoulder land portion and having a larger width than that of the main portion of the first shoulder sipe,
an opening width $W4$ of each first shoulder sipe on the tread face of the first shoulder land portion is greater than an opening width $W5$ of each first middle sipe on the tread face of the first middle land portion, and
a depth $d1$ of the widening width portion of each first shoulder sipe is smaller than a depth $d2$ of the widening width portion of each first middle sipe.

2. The tire according to claim 1, wherein
the width $Wco$ in the tire axial direction of the outer ground contact surface is in a range of 51% to 55% of the width $Wc$ in the tire axial direction of the crown land portion.

3. The tire according to claim 1, wherein
the first middle land portion is provided with at least one first longitudinal sipe extending in the tire circumferential direction.

4. The tire according to claim 3, wherein
the at least one first longitudinal sipe extends continuously in the tire circumferential direction.

5. The tire according to claim 4, wherein
the at least one first longitudinal sipe extends in a zigzag manner.

6. The tire according to claim 3, wherein
the at least one first longitudinal sipe comprises a set of plurality of first longitudinal sipes spaced in the tire circumferential direction.

7. The tire according to claim 1, wherein
the first middle land portion comprises
a first longitudinal edge located on the first tread edge side,
a second longitudinal edge located on the second tread edge side, and
the ground contact surface between the first longitudinal edge and the second longitudinal edge, and
the first middle land portion is provided with
outboard first middle sipes communicating with the first longitudinal edge and having closed ends within the first middle land portion, and
inboard first middle sipes communicating with the second longitudinal edge and having closed ends within the first middle land portion.

8. The tire according to claim 7, wherein
a length in the tire axial direction of the outboard first middle sipes is in a range of 20% to 45% of a width in the tire axial direction of the first middle land portion.

9. The tire according to claim 7, wherein
a length in the tire axial direction of the inboard first middle sipes is in a range of 20% to 45% of a width in the tire axial direction of the first middle land portion.

10. The tire according to claim 1, wherein
the first shoulder land portion comprises the first tread edge and a buttress surface located outwardly in the tire axial direction than the first tread edge, and
the buttress surface is provided with a plurality of first shoulder lateral grooves extending in the tire axial direction.

11. The tire according to claim 10, wherein
a minimum length in the tire axial direction from the first tread edge to the plurality of first shoulder lateral grooves is equal to or less than 10 mm.

12. The tire according to claim 10, wherein
a groove width of the plurality of first shoulder lateral grooves is in a range of 3 to 15 mm.

13. The tire according to claim 10, wherein
a maximum depth of the plurality of first shoulder lateral grooves is in a range of 50% to 90% of a maximum depth of the plurality of circumferential grooves.

14. The tire according to claim 10, wherein
the plurality of land portions comprises a second shoulder land portion comprising the second tread edge and a buttress surface located outwardly in the tire axial direction than the second tread edge, and
the buttress surface of the second shoulder land portion is provided with a plurality of second shoulder lateral grooves extending in the tire axial direction.

15. The tire according to claim 1, wherein
the plurality of first middle sipes includes a plurality of outboard first middle sipes extending from a first longitudinal edge on the first tread edge side of the first middle land portion, and
in a tread plan view, the widening width portions of the outboard first middle sipes overlap with respective regions in which the widening width portions of the first shoulder sipes are expanded along the respective longitudinal direction of the first shoulder sipes to the first longitudinal edge.

* * * * *